US012462225B2

United States Patent
Bach et al.

(10) Patent No.: US 12,462,225 B2
(45) Date of Patent: *Nov. 4, 2025

(54) SYSTEM FOR RESERVING AND CONFIGURING USER-PERSONALIZED WORKSPACE

(71) Applicant: Crestron Electronics, Inc., Rockleigh, NJ (US)

(72) Inventors: Robert Bach, Lakewood Ranch, FL (US); Mark Slivovsky, West Caldwell, NJ (US); William Braaf, Dallas, TX (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/960,453

(22) Filed: Nov. 26, 2024

(65) Prior Publication Data

US 2025/0086597 A1    Mar. 13, 2025

Related U.S. Application Data

(63) Continuation of application No. 17/718,953, filed on Apr. 12, 2022, now Pat. No. 12,198,106.
(Continued)

(51) Int. Cl.
*G06Q 10/02* (2012.01)
*G06K 7/10* (2006.01)
(Continued)

(52) U.S. Cl.
CPC ..... *G06Q 10/1093* (2013.01); *G06K 7/10297* (2013.01); *G06K 7/10366* (2013.01);
(Continued)

(58) Field of Classification Search
CPC ...... G06Q 10/10; G06Q 10/02; G06Q 10/067; G06Q 10/109
See application file for complete search history.

(56) References Cited

U.S. PATENT DOCUMENTS

| 8,644,473 B1 | 2/2014 | Bardwell et al. |
| 9,204,291 B2 | 12/2015 | Jackson et al. |

(Continued)

FOREIGN PATENT DOCUMENTS

WO    2018/231828 A1    12/2018

OTHER PUBLICATIONS

O. Barker, "Realizing the Promise of the Internet of Things in Smart Buildings," in Computer, vol. 53, No. 2, pp. 76-79, Feb. 2020, doi: 10.1109/MC.2019.2952419 (Year: 2000).*

(Continued)

*Primary Examiner* — Michael P Harrington
(74) *Attorney, Agent, or Firm* — CRESTRON ELECTRONICS, INC.

(57) ABSTRACT

A system reserves and provides a user with a personalized workspace. A workspace includes a workspace device. A panel includes a display. A docking station includes at least one power port and at least one data port connected to the workspace device. A portal controls operation and configuration of the workspace, docking station, and panel. The portal receives a user-initiated request to reserve the workspace for a predetermined period and specifying one or more workspace devices required by the user. The portal generates a 2D code, transmits the 2D code to the panel, and transmits information to a user device. The portal receives, from the user device, data generated by the user device from a scan of the 2D code on the display, and in response, checks in the user into the workspace, and activates and configures the docking station according to the user request.

24 Claims, 29 Drawing Sheets

Related U.S. Application Data

(60) Provisional application No. 63/182,466, filed on Apr. 30, 2021, provisional application No. 63/174,379, filed on Apr. 13, 2021.

(51) Int. Cl.
  *G06K 7/14* (2006.01)
  *G06Q 10/1093* (2023.01)
  *H04L 9/40* (2022.01)
  *H04W 4/12* (2009.01)

(52) U.S. Cl.
  CPC ............ *G06K 7/1417* (2013.01); *G06Q 10/02* (2013.01); *H04L 63/061* (2013.01); *H04W 4/12* (2013.01)

(56) References Cited

U.S. PATENT DOCUMENTS

| | | | |
|---|---|---|---|
| 9,380,682 | B2 | 6/2016 | Mead et al. |
| 9,602,172 | B2 | 3/2017 | Jackson et al. |
| 9,723,035 | B1 | 8/2017 | Siddiqui |
| 10,044,871 | B2 | 8/2018 | Bargetzi et al. |
| 10,178,737 | B2 | 1/2019 | Mohan et al. |
| 10,237,256 | B1 | 3/2019 | Pena et al. |
| 10,505,751 | B2 | 12/2019 | Casilli |
| 10,798,233 | B2 | 10/2020 | Sherburne |
| 11,212,898 | B2 | 12/2021 | Mead et al. |
| 11,315,081 | B2 | 4/2022 | Fujimura |
| 11,558,914 | B2 | 1/2023 | Alexander |
| 11,574,255 | B2 | 2/2023 | Gibson |
| 2005/0091338 | A1 | 4/2005 | de la Huerga |
| 2011/0010218 | A1 | 1/2011 | Gupta |
| 2013/0209108 | A1 | 8/2013 | Krishnakumar et al. |
| 2014/0113589 | A1 | 4/2014 | Kurupacheril et al. |
| 2015/0359070 | A1 | 12/2015 | Mead et al. |
| 2015/0371306 | A1 | 12/2015 | Besson |
| 2017/0006162 | A1 | 1/2017 | Bargetzi |
| 2017/0208664 | A1 | 7/2017 | Mead et al. |
| 2018/0137369 | A1 | 5/2018 | Roth et al. |
| 2020/0010216 | A1 | 1/2020 | Devaux et al. |
| 2020/0104762 | A1 | 4/2020 | Gibson et al. |
| 2020/0163181 | A1 | 5/2020 | Shah et al. |
| 2021/0097596 | A1 | 4/2021 | Gaber et al. |
| 2021/0117693 | A1 | 4/2021 | Martin et al. |
| 2021/0144697 | A1 | 5/2021 | Norota |
| 2021/0240143 | A1 | 8/2021 | Stancil et al. |
| 2021/0295217 | A1* | 9/2021 | Nagahara ......... G06Q 10/06315 |
| 2021/0329408 | A1 | 10/2021 | Spahn |
| 2022/0022012 | A1 | 1/2022 | Meier et al. |
| 2022/0327493 | A1 | 10/2022 | Bach |
| 2022/0408269 | A1 | 12/2022 | Termanini |
| 2023/0049989 | A1 | 2/2023 | Franc De Ferriere |

OTHER PUBLICATIONS

"Sun, Mitel Team Up on UC Client, Hot-Desking", Mar. 17, 2008, https://www.eweek.com/networking/Sun-Mitel-Team-Up--on-UC-Client-Hot-Desking/.

"Notice of References Cited", PTO-892, U.S. Appl. No. 17/498,010, filed Nov. 20, 2023.

"Notice of References Cited", PTO-892, U.S. Appl. No. 17/498,010, filed Feb. 1, 2024.

"Notice of References Cited", PTO-892, U.S. Appl. No. 17/734,692, filed Feb. 9, 2024.

* cited by examiner

SYSTEM FOR RESERVING AND CONFIGURING USER-PERSONALIZED WORKSPACE

CROSS-REFERENCE TO RELATED APPLICATIONS

This application is a continuation of U.S. patent application Ser. No. 17/718,953, filed Apr. 12, 2022, now U.S. Pat. No. 12,198,106, issued Jan. 14, 2025, which claims the benefit of the filing date of U.S. Provisional Patent Application No. 63/174,379, filed Apr. 13, 2021, and U.S. Provisional Patent Application No. 63/182,466, filed Apr. 30, 2021, the disclosures of which are incorporated herein by reference.

BACKGROUND OF THE INVENTION

Technical Field

The present embodiments relate to hot-desking, and more particularly, to a system for configuring, reserving, checking into, and maintaining a hot-desking station or workspace.

Background Art

In the corporate environment, there has been a growing trend to move to agile workspaces, open floor plans, and hot-desking, also known as hoteling. These trends existed before the Covid-19 pandemic, but with the recent closure of many offices due to the pandemic, working from home became a standard practice that has continued, at least in part, even with the gradual reopening of many workplaces. Rather than return fulltime to the workplace, many employees now work in their offices for only part of the week or intermittently, reducing or eliminating the need for dedicated office space for each employee.

Corporations that, in 2019, were already cutting desk commitments by 10-20% to reduce real estate costs and to offset employee vacations and other absences have continued to pursue this trend. Building architects and interior designers are pushing open floor plan concepts in which non-traditional workspaces are intermingled with traditional seated desks, standing work areas, and bar height collaboration tables. As a result, traditional clustered departments offices have been turned into "neighborhoods" of flexible unassigned seating.

Space booking addresses many of the issues inherent in, for example, first-come first-serve desk availability by assuring the availability of desks or desk "neighborhoods". With space booking, the user has to log in remotely from home and select their workspace for a given day or range of days with availability of the workspace assured. The employee then checks in at the office to activate the workspace. Alternatively, the employee logs in using their personal mobile device, such as their cellphone, and then checks in at the office. Both of these options, typically require at least entry of a login and password to book the workspace and then configure the workspace.

It is therefore desirable to provide a system that provides a more convenient hot-desking reservation process.

It is further desirable to provide a system that affords a more convenient and straightforward check in process.

SUMMARY OF THE INVENTION

It is to be understood that both the general and detailed descriptions that follow are exemplary and explanatory only and are not restrictive.

Disclosure of Invention

In accordance with an aspect, a hot-desking system comprises (a) at least one hot-desking station, including (1) at least one hot-desking station device, and (2) a hot-desk panel configured to display information regarding status of the hot-desking station and to display a two-dimensional barcode (2D code) associated with the hot-desking station; (b) at least one docking station associated with the at least one hot-desking station, including (1) a plurality of input and output ports, at least one of the plurality of input and output ports being connected to the at least one hot-desking station device; and (c) a hot-desking portal configured to control operation of and configuration of the at least one hot-desking station, the at least one docking station, and the at least one hot-desk panel of the at least one hot-desking station, the hot-desking portal being further configured to (1) receive, from a user device over at least one communication network, a request to reserve the at least one hot-desking station for a predetermined period, and identification information associated with the user, (2) communicate, over the at least one communication network, with a user database to verify the identification information associated with the user, (3) reserve the at least one hot-desking station for the user for the predetermined period in response to the identification information associated with the user being verified, (4) transmit, to the user device over the at least one communication network, an indication that the identification information associated with the user was verified and information describing a location and features of the reserved least one hot-desking station, (5) receive, from the user device over the at least one communication network, scanned data read by the user device from the 2D code displayed by the hot-desk panel, and (6) in response to receiving the scanned data, check in the user into the at least one hot-desking station, and activate and configure the at least one docking station.

According to a further aspect, a method of reserving and checking into a hot-desking station comprises (a) receiving, at a hot-desking portal configured to control operation of and configuration of (i) at least one hot-desking station, (ii) at least one docking station associated with the at least one hot-desking station, and (iii) at least one hot-desking station device associated with the at least one hot-desking station, a request from a user device over at least one communication network to reserve the hot-desking station for a predetermined period, the request including identification information associated with the user; (b) communicating, by the hot-desking portal over the at least one communication network, with a user database to verify the identification information associated with the user, (c) reserving, at the hot-desking portal, the hot-desking station for the user for the predetermined period in response to the identification information associated with the user being verified; (d) transmitting, from the hot-desking portal to the user device over the at least one communication network, (1) an indication that the identification information associated with the user was verified, and (2) information describing a location and features of the reserved hot-desking station; (e) receiving, by the hot-desking portal over the at least one communication network, scanned data transmitted by the user device, the scanned data being read by the user device from a two-dimensional barcode (2D code) displayed at a hot-desk panel associated with the at least one hot-desking station; and (f) in response to receiving the scanned data, the hot-desking portal checking in the user to the hot-desking station and activating and configuring the at least one docking station associated with the at least one hot-desking station based on information associated with the reservation request.

According to another aspect, a hot-desking system comprises (a) a plurality of hot-desking stations, each including (1) at least one hot-desking station device, and (2) a hot-desk panel configured to display information regarding status of that hot-desking station, and to display a two-dimensional barcode (2D code) associated with that hot-desking station, the information regarding status of the hot-desking station including information on times when the hot-desking station is available for booking, the 2D code including at least one of a QR code or a matrix barcode; (b) a plurality of docking stations respectively associated with the plurality of hot-desking stations, each including (1) a plurality of input and output ports, at least one of the plurality of input and output ports being connected to the at least one hot-desking station device of its associated hot-desking station, the plurality of input and output ports including at least one of data ports or power ports; (c) a hot-desking portal configured to control operation of and configuration of the plurality of hot-desking stations, the plurality of docking stations, and the hot-desk panel of each of the plurality of hot-desking stations, the hot-desking portal being further configured to (1) receive, from a user device over at least one communication network, a request to reserve one of the plurality of hot-desking stations for a predetermined period, and identification information associated with the user, (2) communicate, over the at least one communication network, with a user database to verify the identification information associated with the user, (3) reserve a given one of the plurality of hot-desking stations for the user for the predetermined period in response to the identification information associated with the user being verified, (4) transmit, to the user device over the at least one communication network, an indication that the identification information associated with the user was verified and information describing a location and features of the reserved hot-desking station, (5) receive, from the user device over the at least one communication network, scanned data read by the user device from the 2D code displayed by the hot-desk panel of the reserved hot-desking station, the 2D code being generated by the hot-desking portal in response to that hot-desking station being reserved, and (6) in response to receiving the scanned data, check in the user to the one of the plurality of hot-desking stations and turn on and configure the at least one device of the reserved hot-desking station; and (d) an admin portal configured to access the database and to enable addition, deletion, or modification of data associated with the user.

BRIEF DESCRIPTION OF DRAWINGS

The accompanying figures further illustrate the present embodiments.

The components in the drawings are not necessarily drawn to scale, emphasis instead being placed upon clearly illustrating the principles of the present embodiments. In the drawings, like reference numerals designate corresponding parts throughout the several views.

Figure 1:
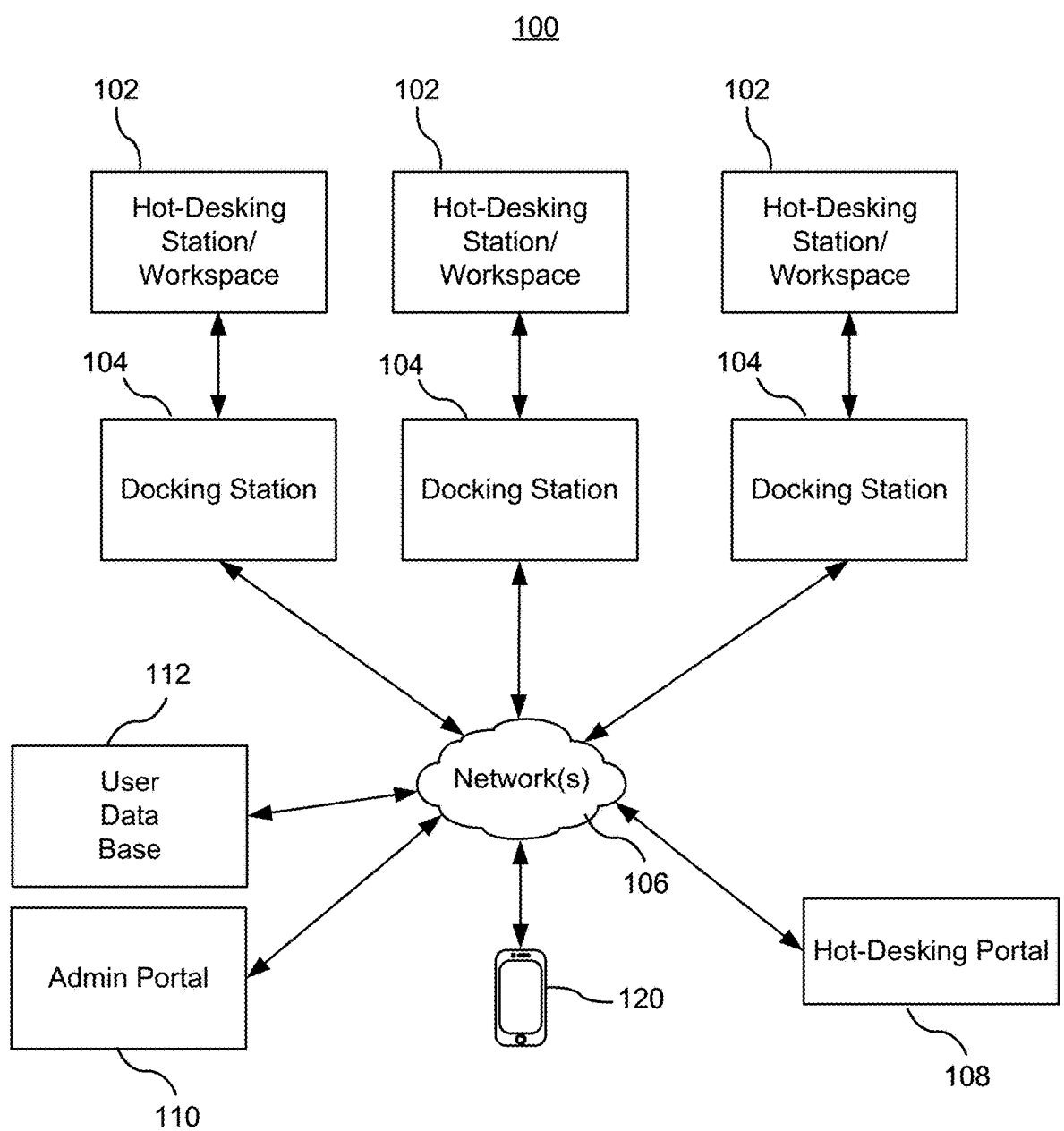

Brief Description of the Several Views of the Drawing

FIG. 1 is a block diagram of a hot-desking system according to an embodiment.

Figure 2:
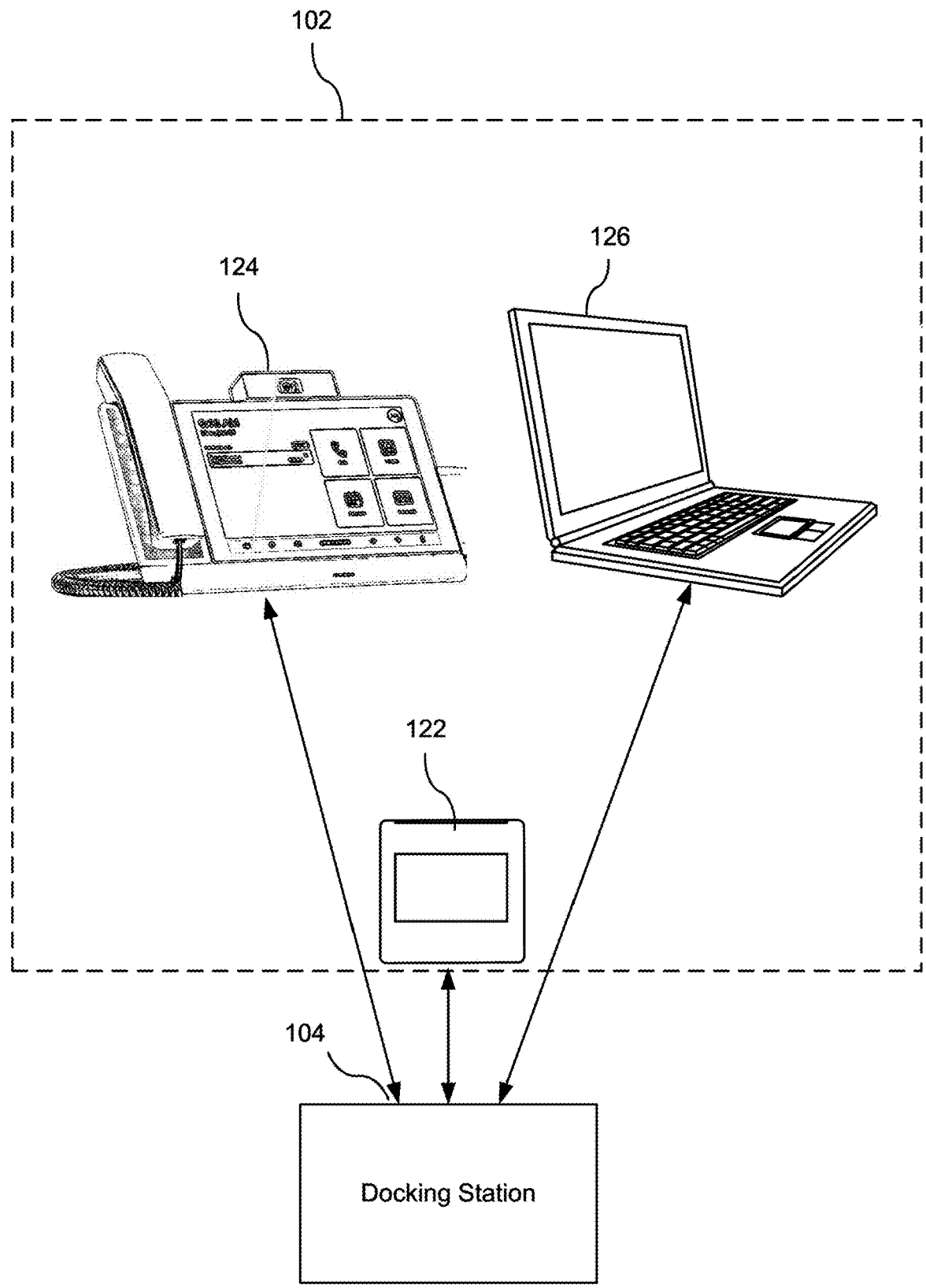

FIG. 2 is a block diagram of an example of the hot-desking station or workspace of FIG. 1 according to an embodiment.

Figure 3A:
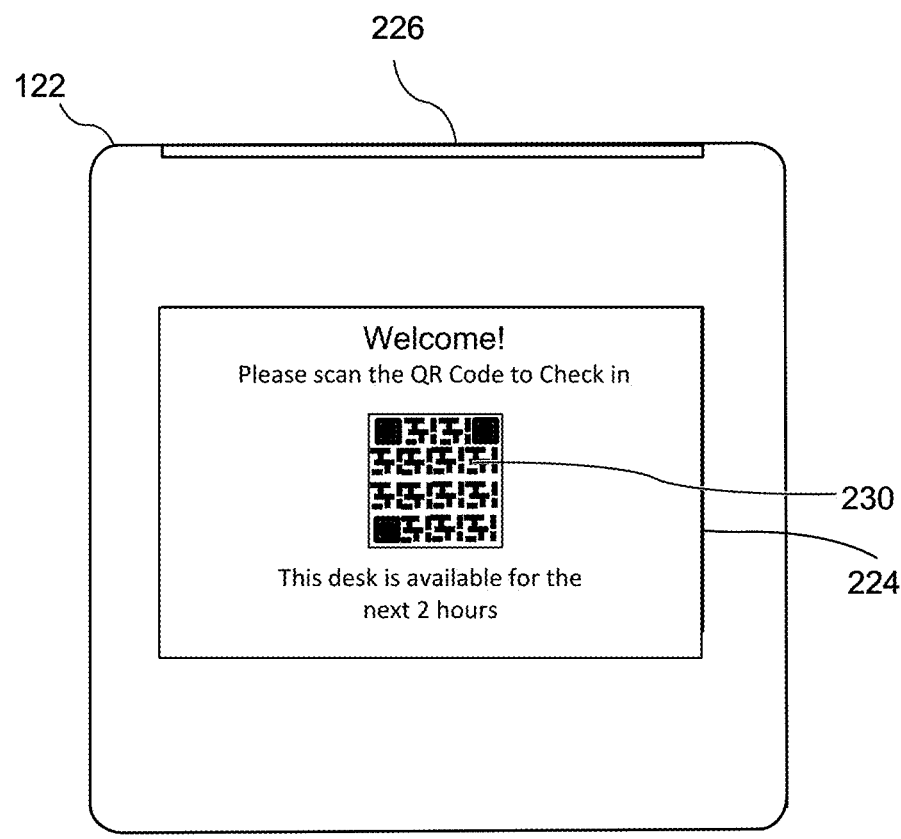
Figure 3B:
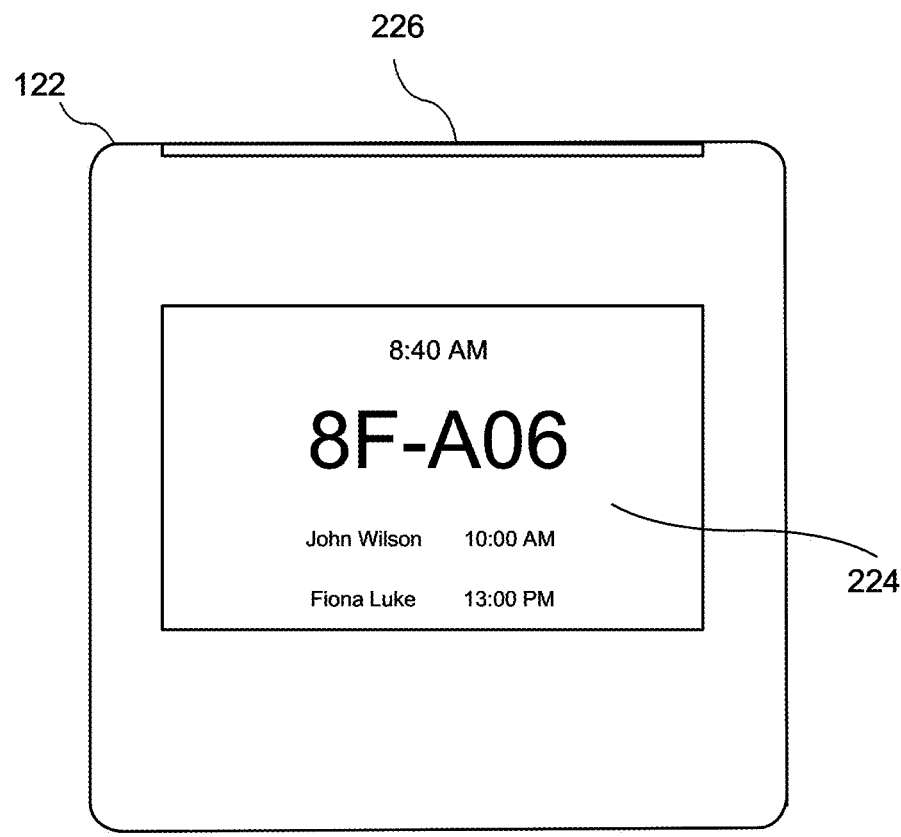

FIGS. 3A and 3B are front views of an example of the hot-desk panel of FIGS. 1 and 2 according to an embodiment.

Figure 4A:
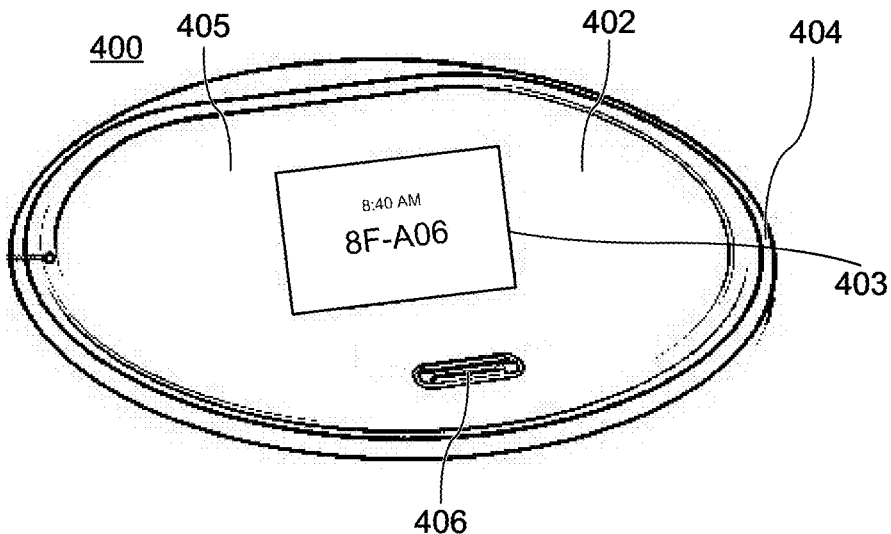
Figure 4B:
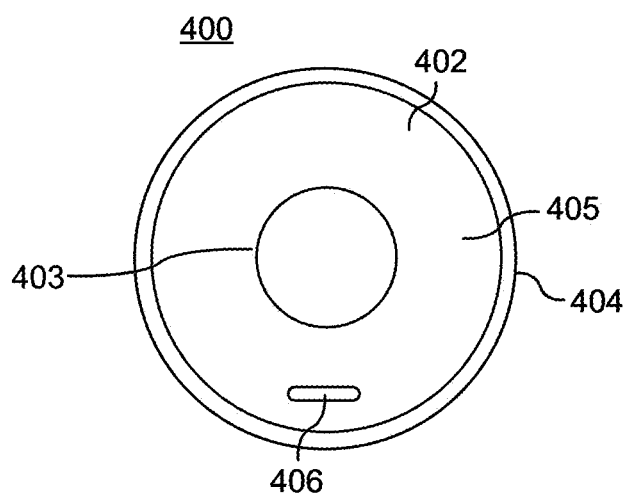
Figure 4C:
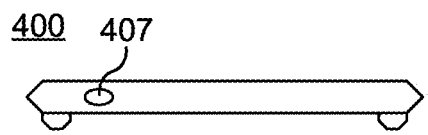

FIG. 4A is a perspective view of another example of the hot-desk panel of FIGS. 1 and 2 according to another embodiment; FIG. 4B is a top view of the hot-desk panel of FIG. 4A; and FIG. 4C is a front view of the hot-desk panel of FIG. 4A.

Figure 5:
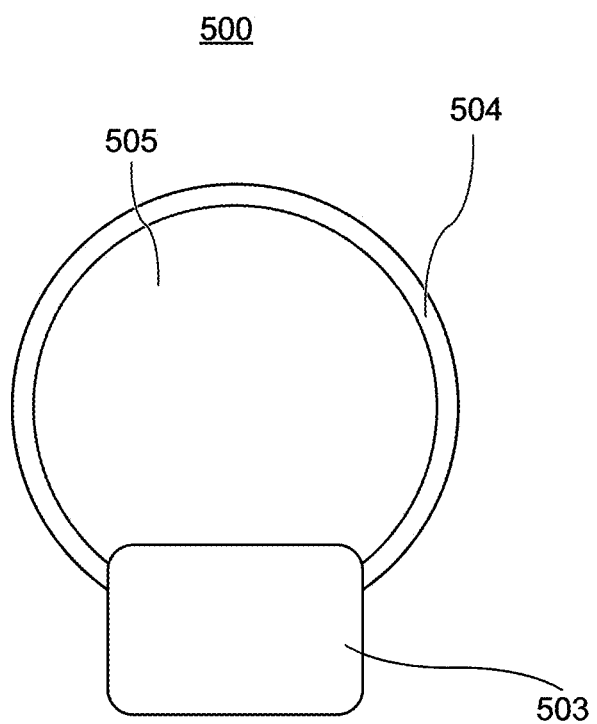

FIG. 5 is a top view of a further example of the hot-desk panel of FIGS. 1 and 2 according to a further embodiment.

Figure 6:
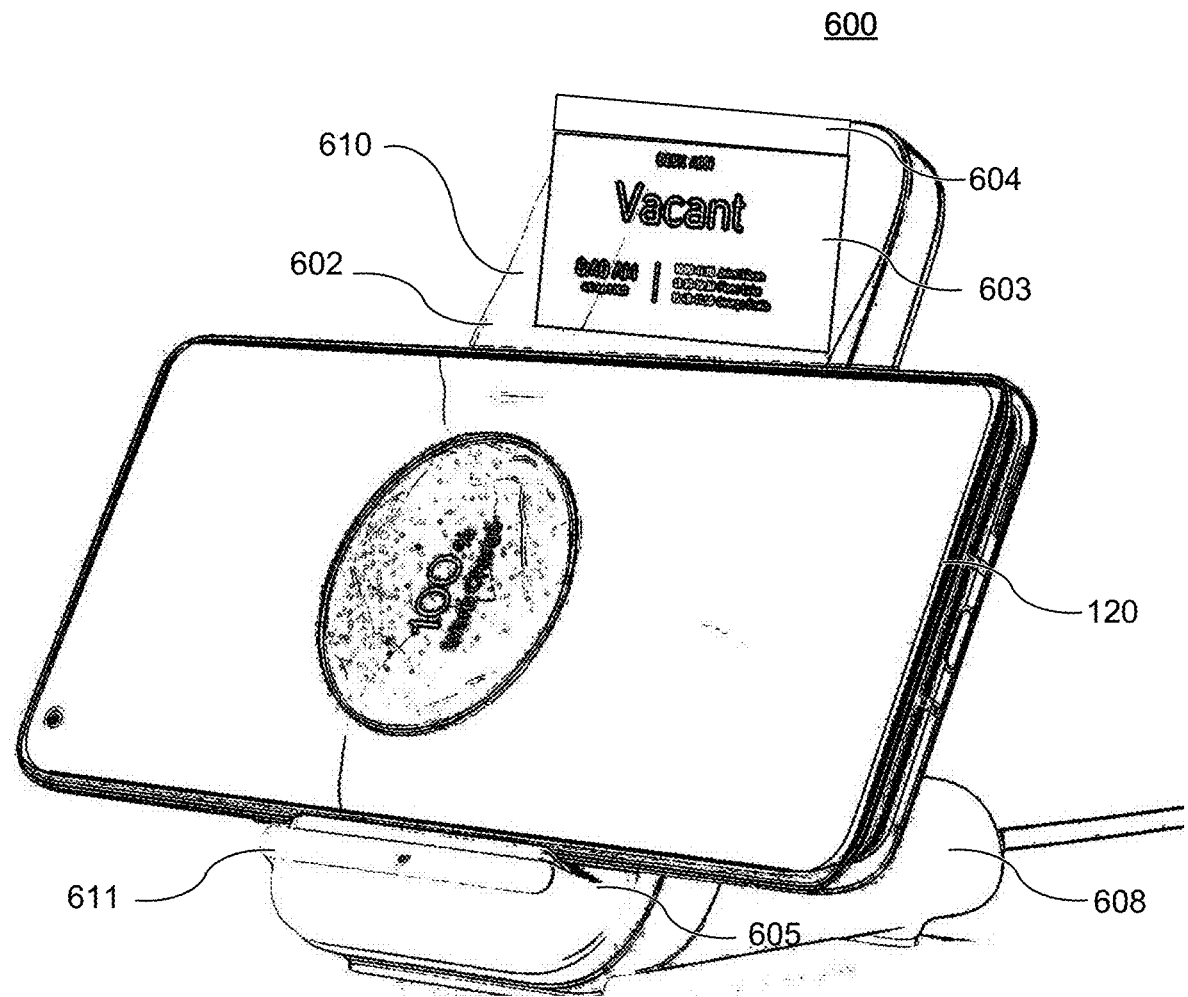

FIG. 6 is a perspective view of a still further example of the hot-desk panel of FIGS. 1 and 2 according to a still further embodiment.

Figure 7A:
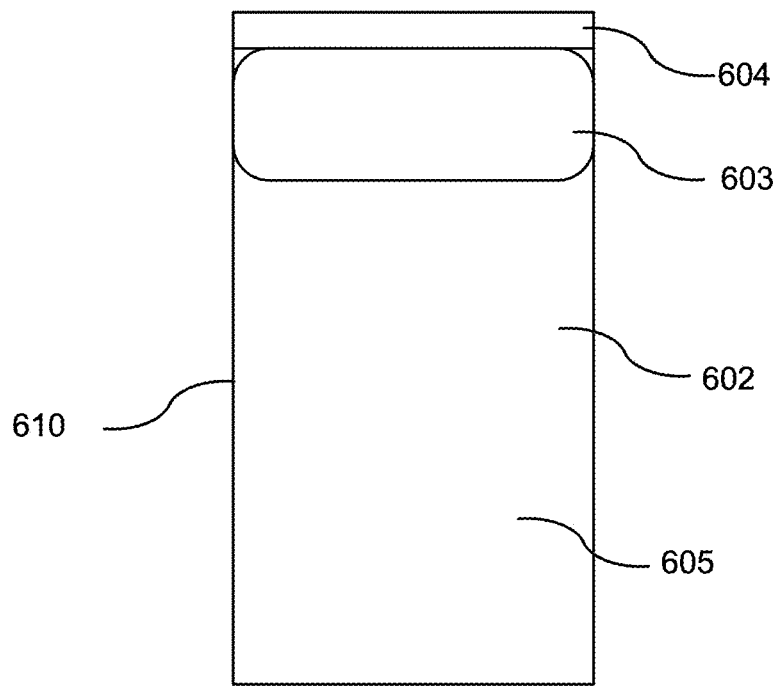
Figure 7B:
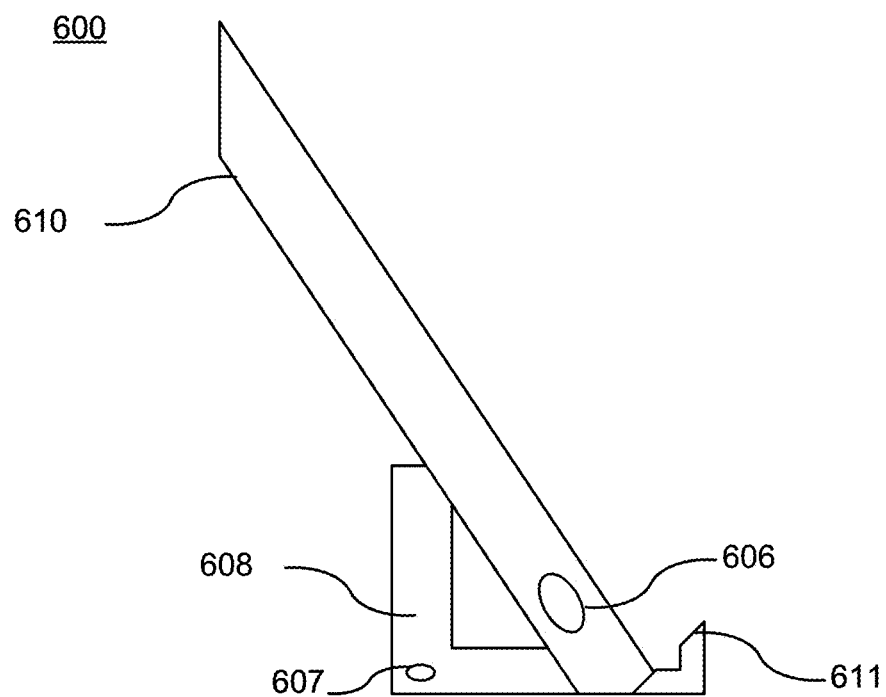

FIG. 7A is a front view of the hot-desk panel of FIG. 6; and FIG. 7B is a side view of the hot-desk panel of FIG. 6.

Figure 8:
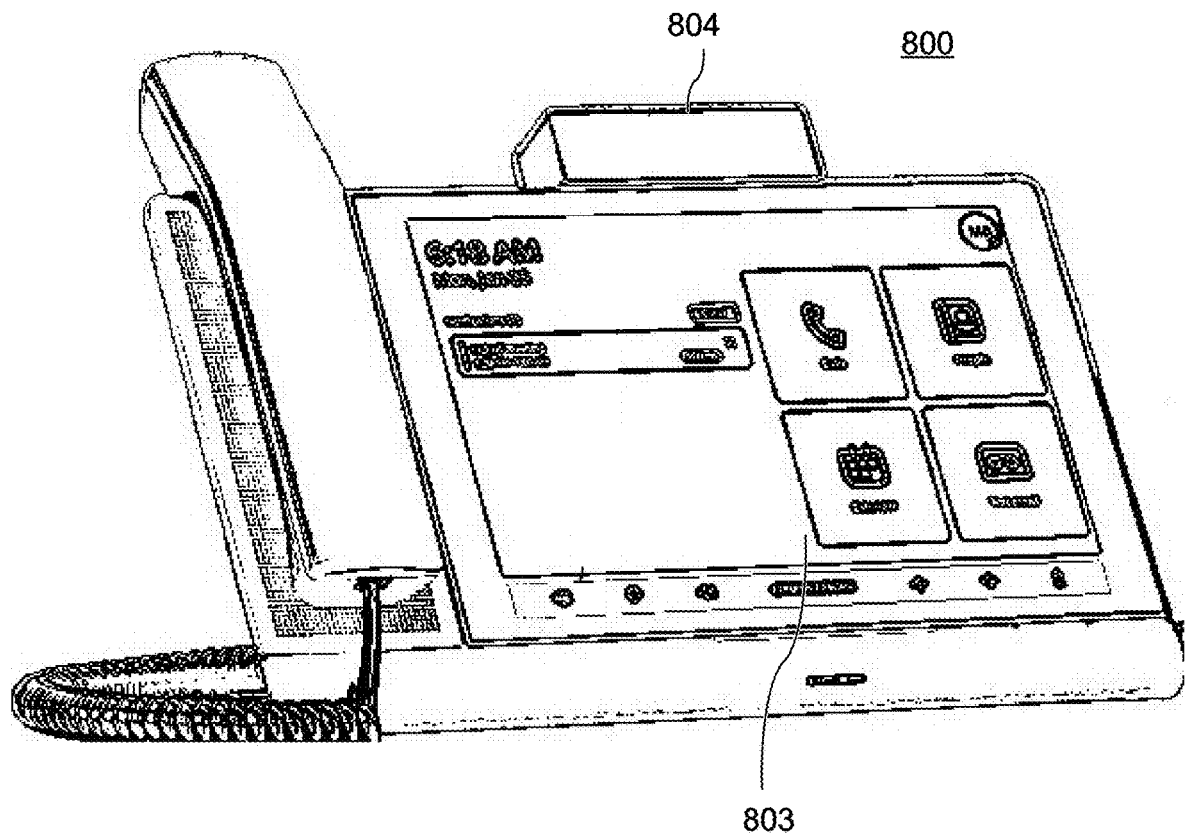

FIG. 8 is a perspective view of yet another example of the hot-desk panel of FIGS. 1 and 2 integrated with a telephone according to an embodiment.

Figure 9:
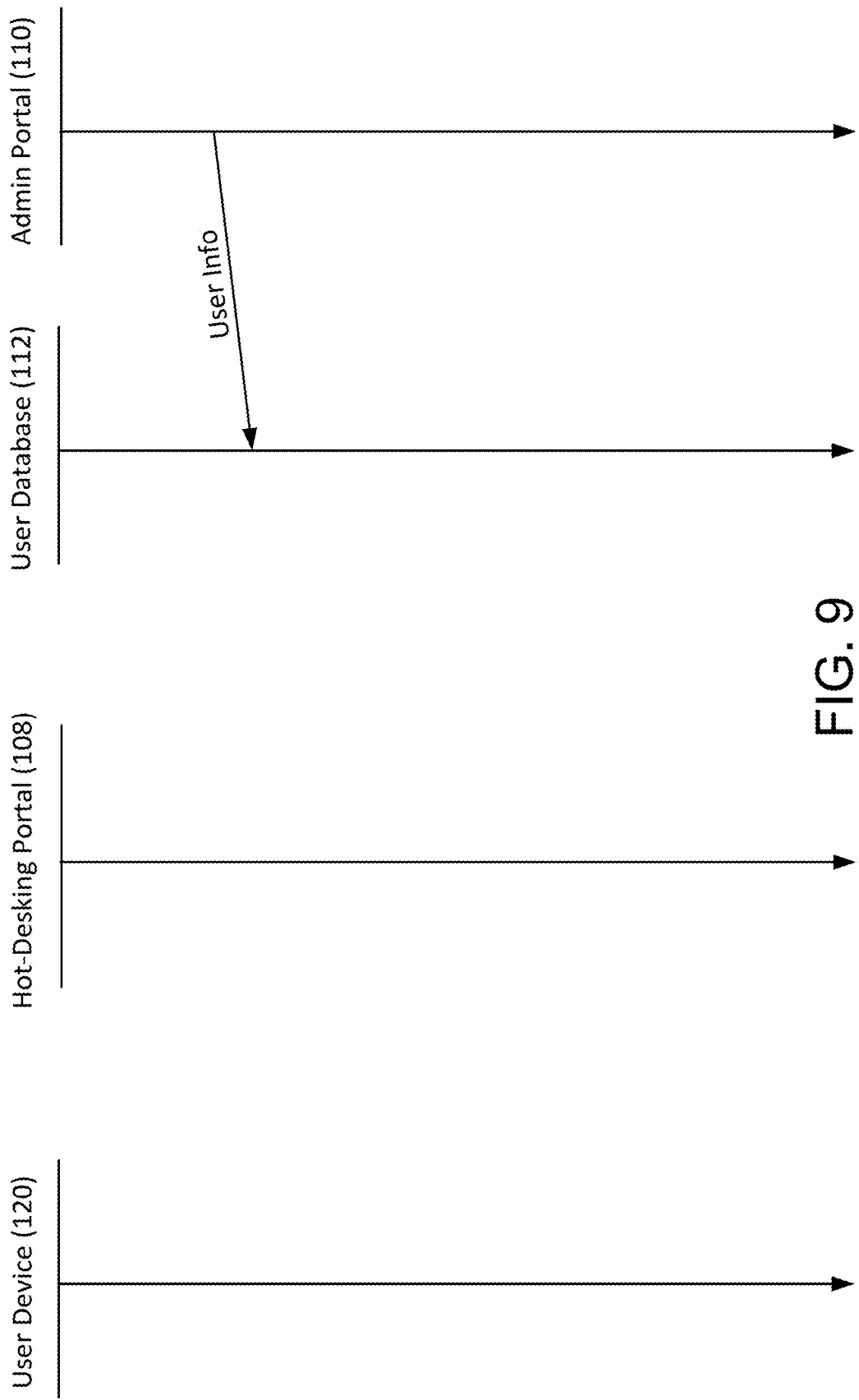

FIG. 9 shows a sequence of messages for setting up a hot-desk user in accordance with an embodiment.

Figure 10:
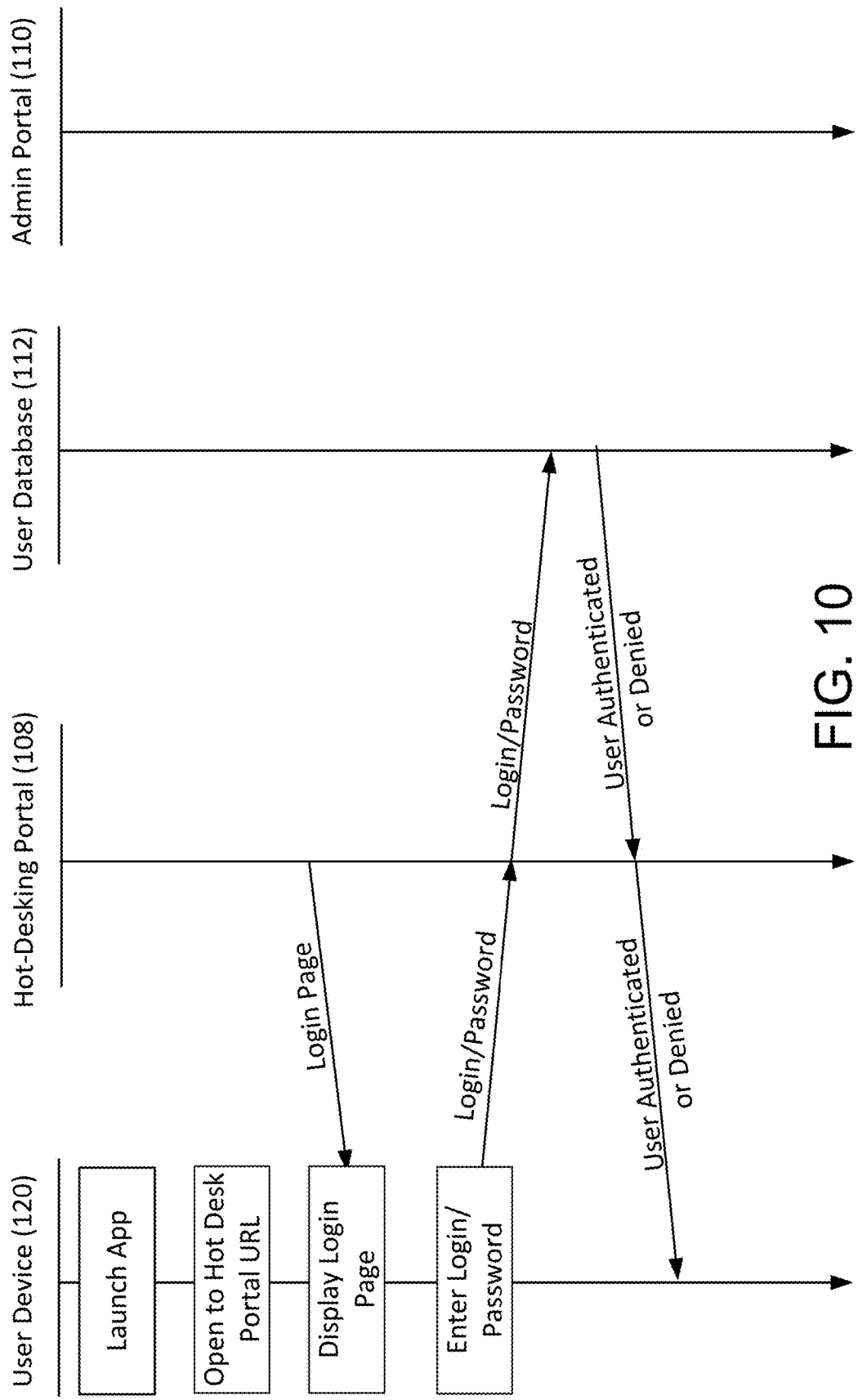

FIG. 10 shows a sequence of messages for logging in a hot-desking user using a user device app in accordance with an embodiment.

Figure 11:
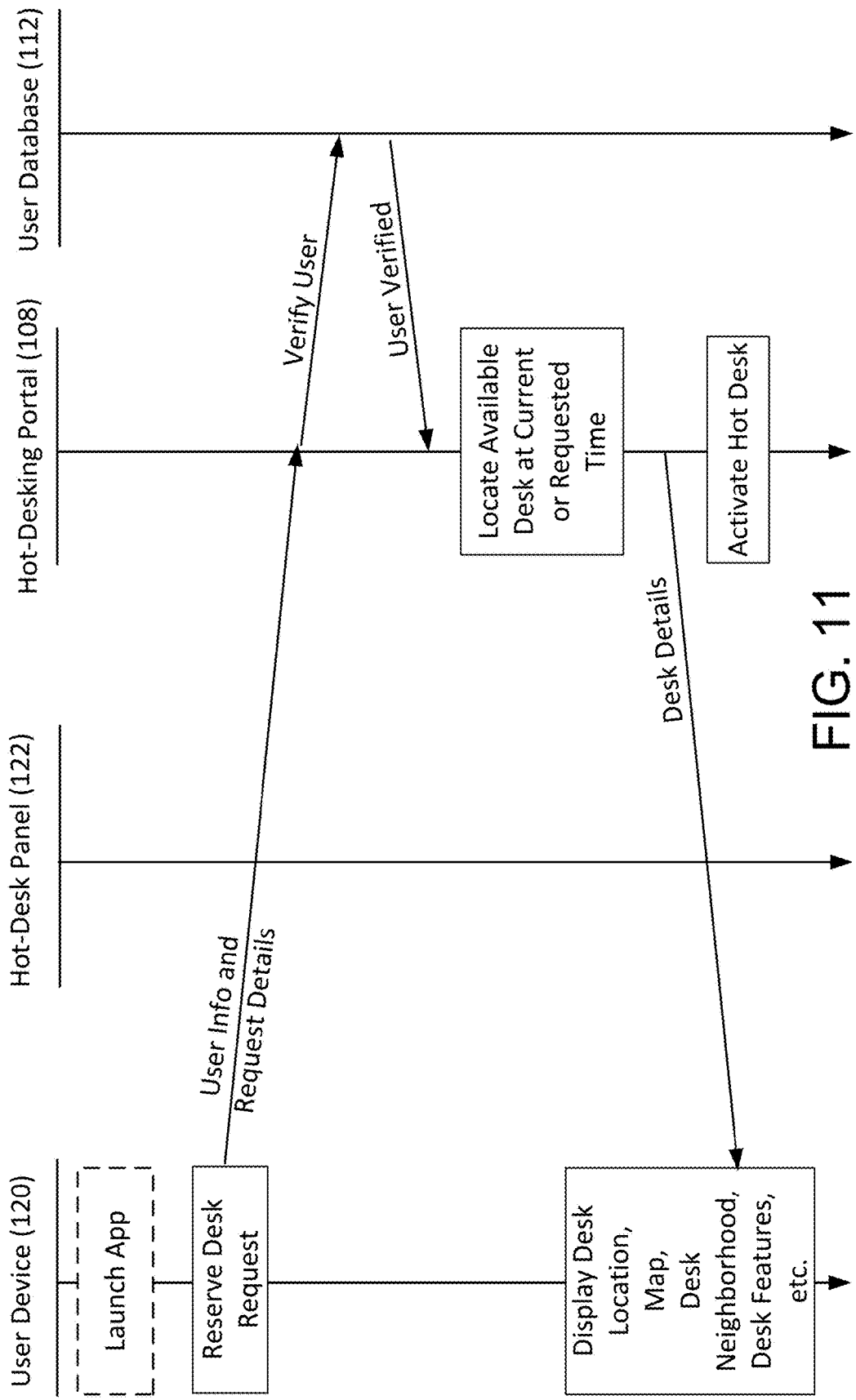

FIG. 11 shows a sequence of messages for reserving a hot-desking using a user device app in accordance with an embodiment.

Figure 12:
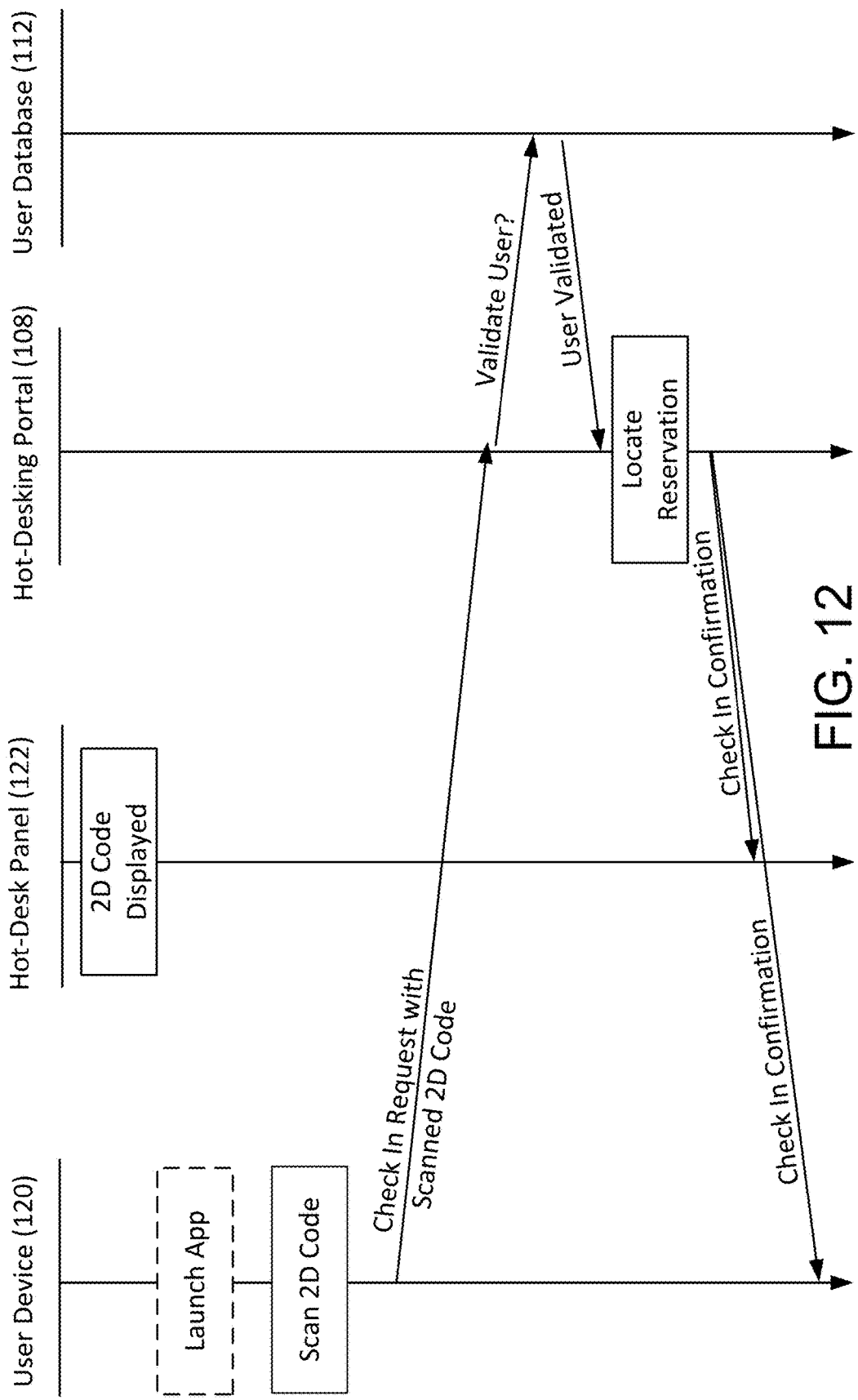

FIG. 12 shows a sequence of messages for user check in to a hot-desking station or workspace using a user device app in accordance with an embodiment.

Figure 13:
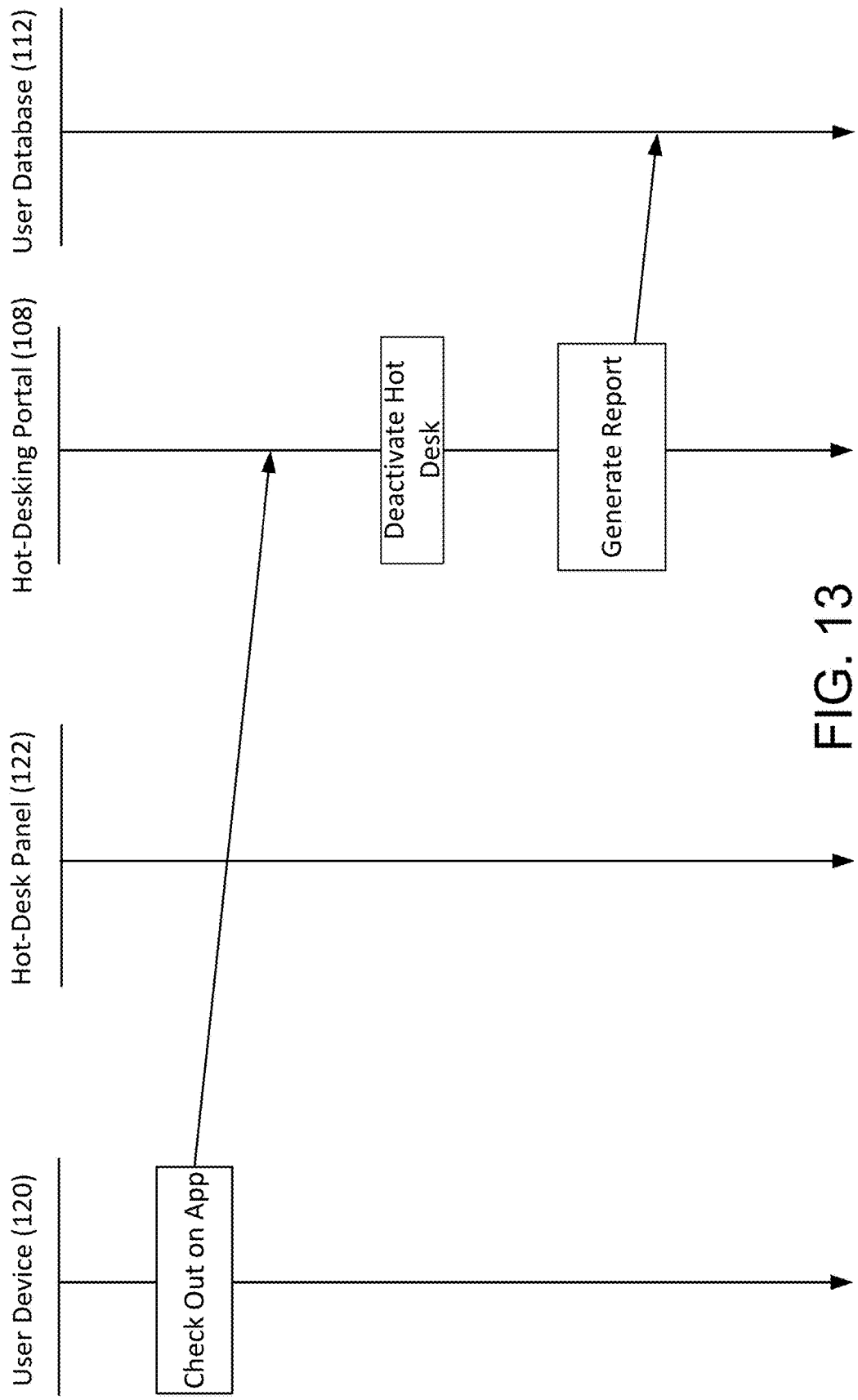

FIG. 13 shows a sequence of messages for user check out from a hot-desking station or workspace using a user device app in accordance with an embodiment.

Figure 14:
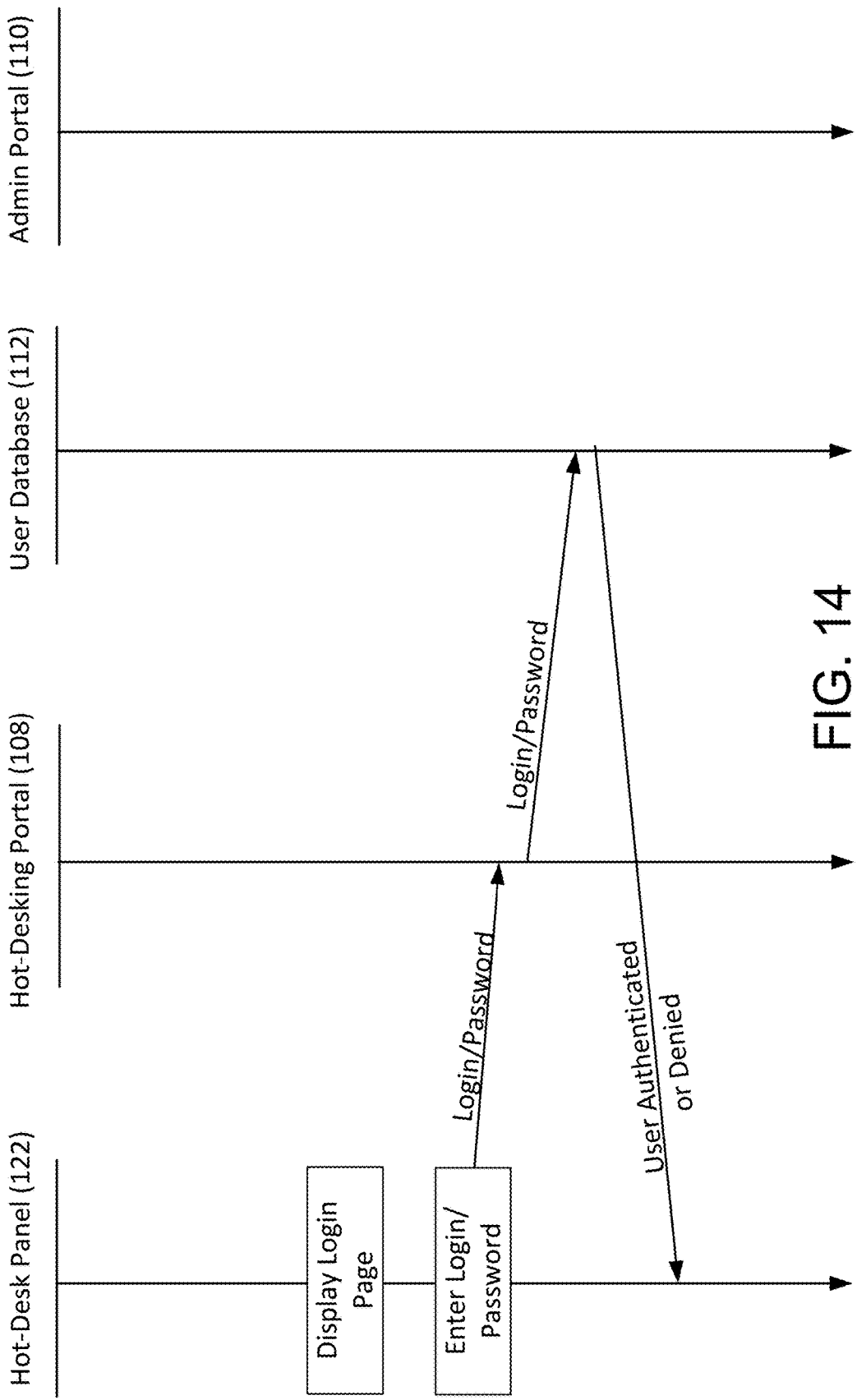

FIG. 14 shows a sequence of messages for logging in a user using the hot-desk panel in accordance with an embodiment.

Figure 15:
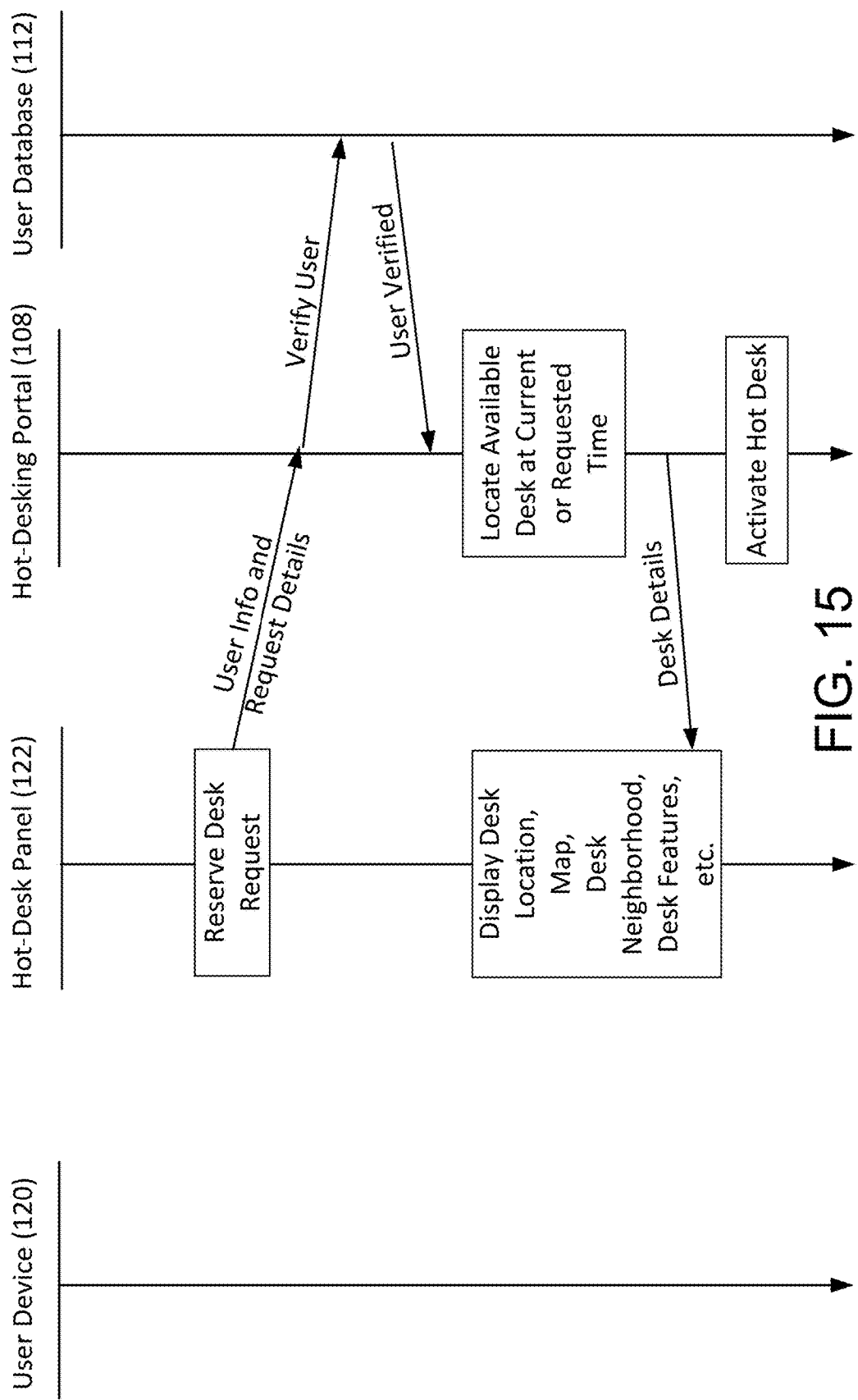

FIG. 15 shows a sequence of messages for reserving a hot-desking station or workspace using the hot-desk panel in accordance with an embodiment.

Figure 16:
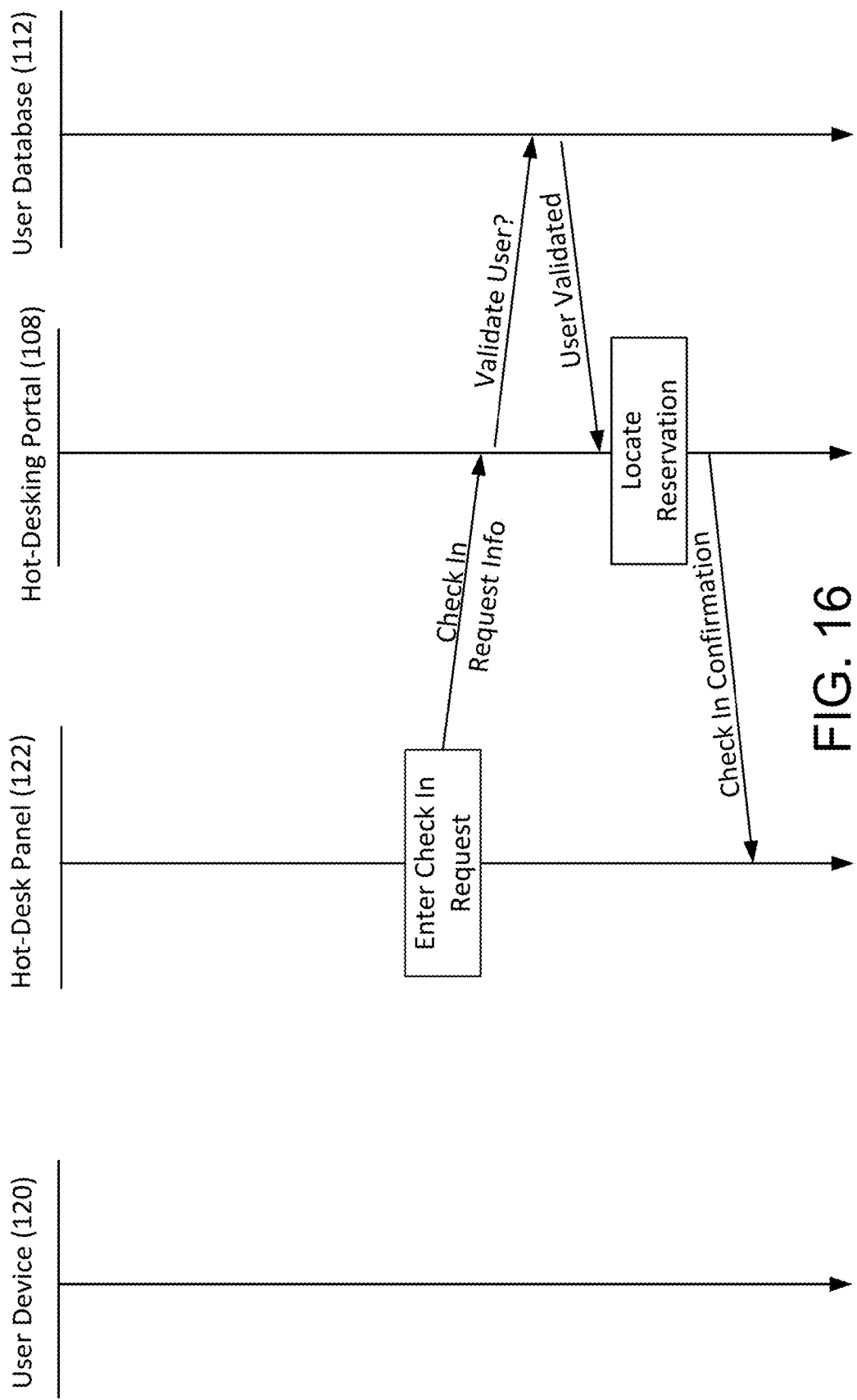

FIG. 16 shows a sequence of messages for user check in to a hot-desking station or workspace using the hot-desk panel in accordance with an embodiment.

Figure 17:
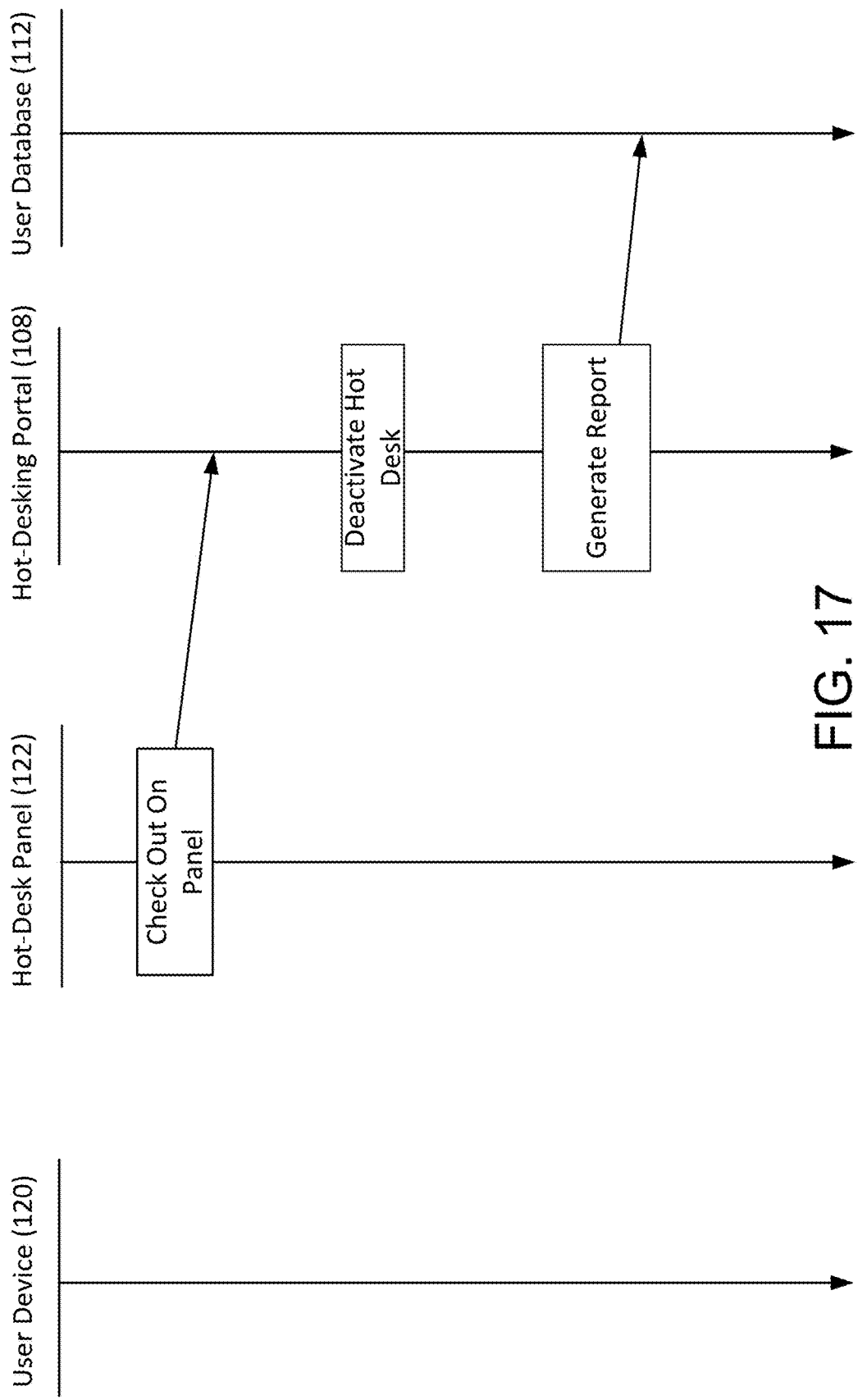

FIG. 17 shows a sequence of messages for user check out from a hot-desking station or workspace using the hot-desk panel in accordance with an embodiment.

Figure 18:
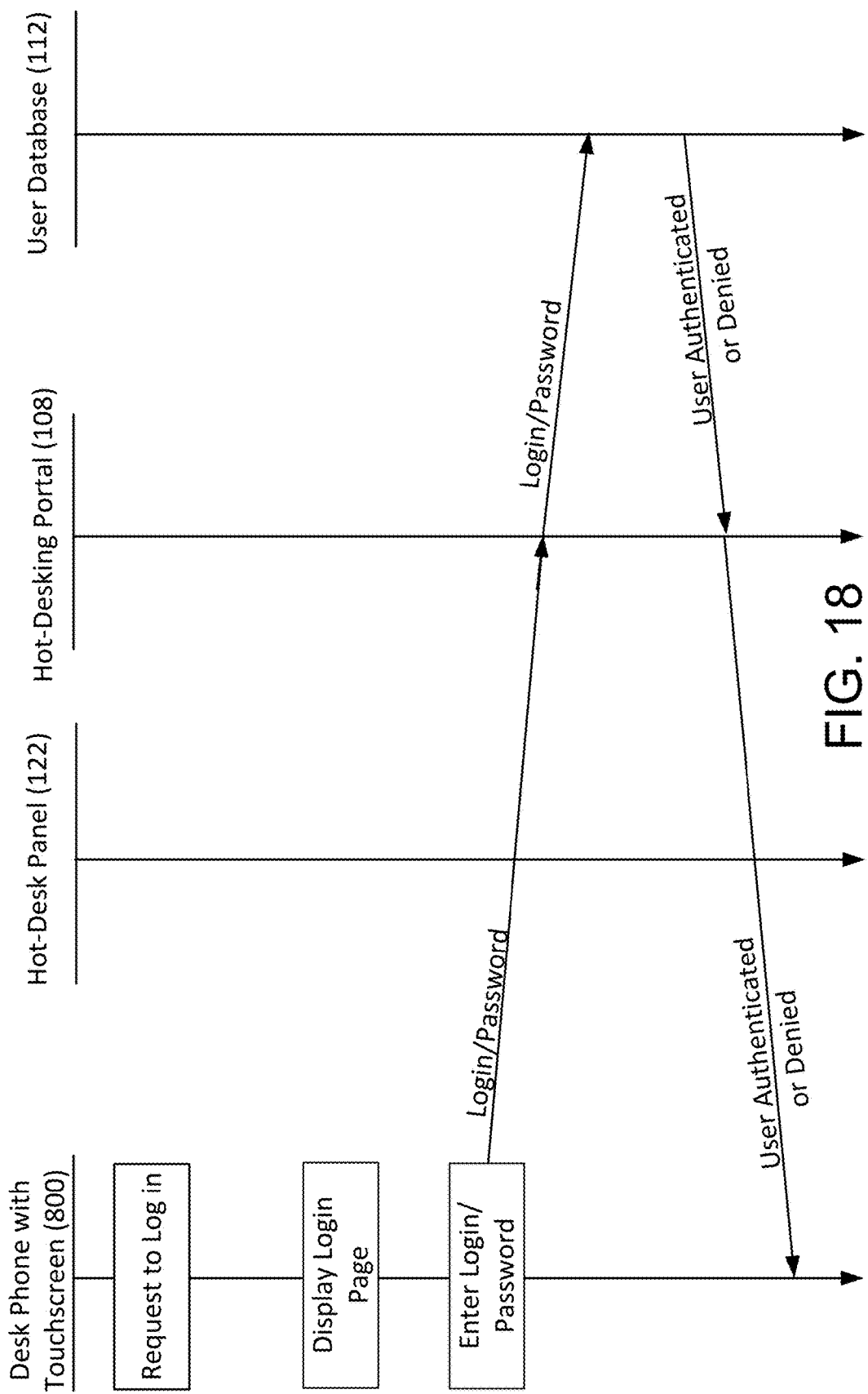

FIG. 18 shows a sequence of messages for logging in a hot-desking user using a user's desk phone with a touchscreen in accordance with an embodiment.

Figure 19:
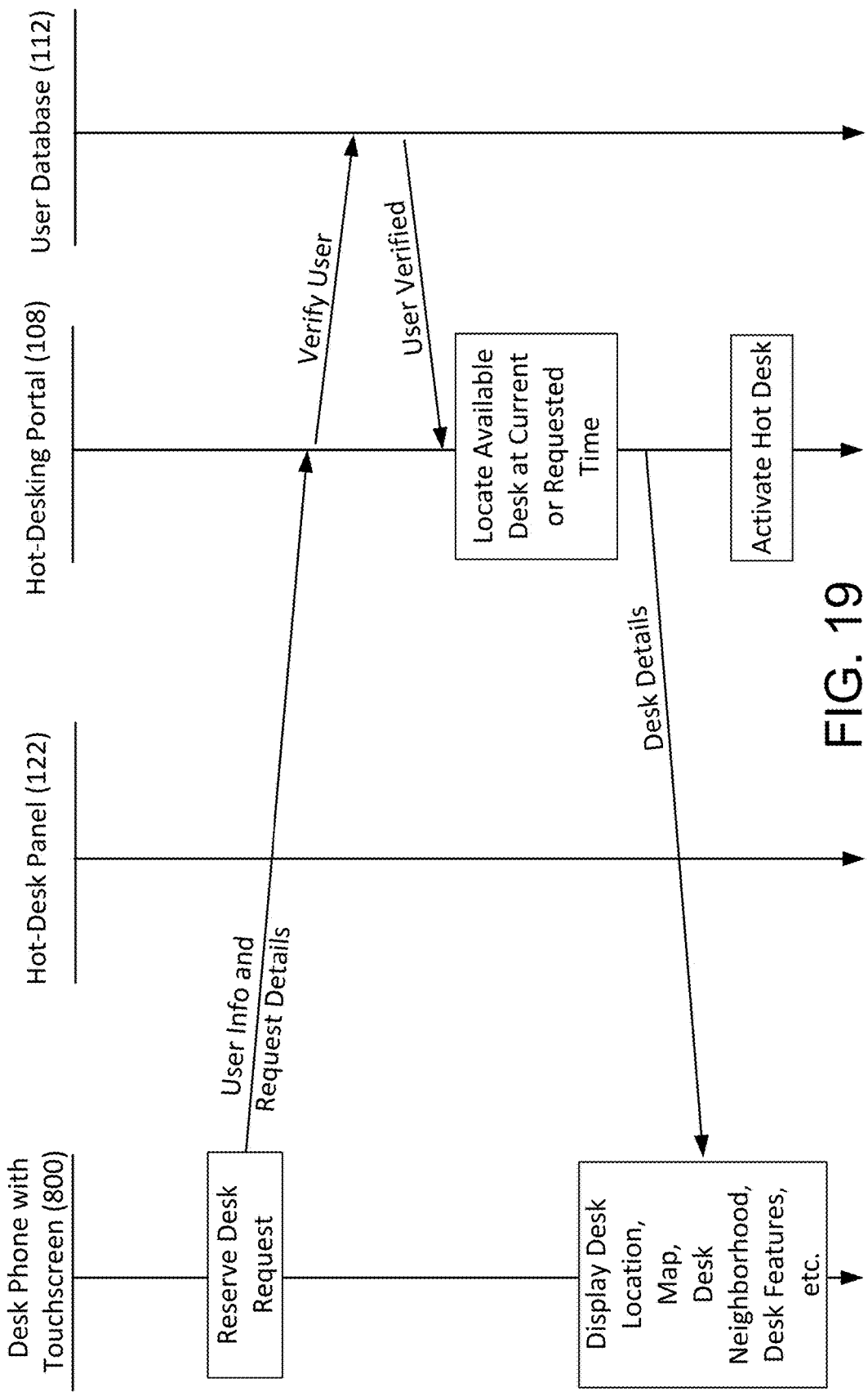

FIG. 19 shows a sequence of messages for reserving a hot-desking station or workspace using a user's desk phone with touchscreen in accordance with an embodiment.

Figure 20:
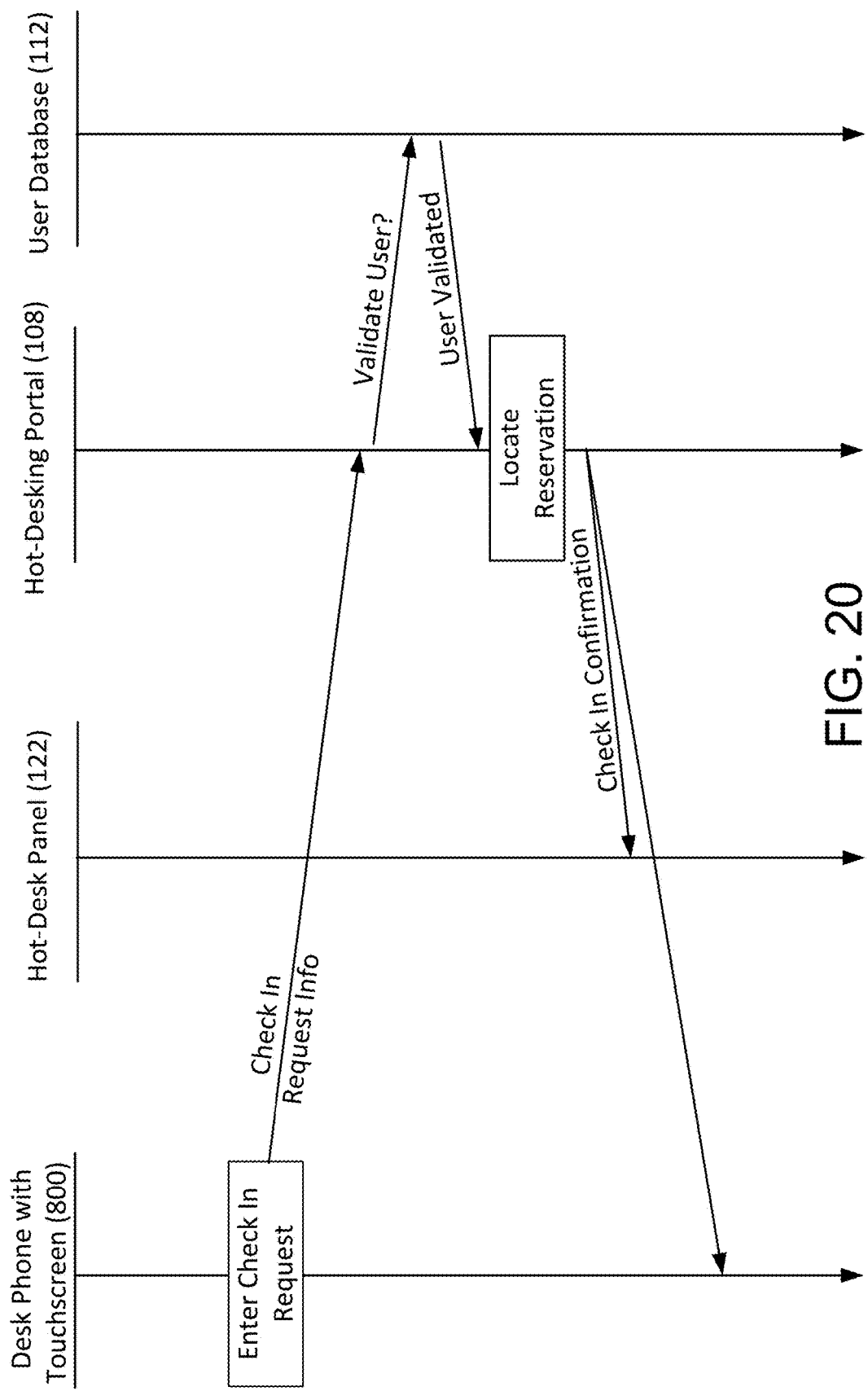

FIG. 20 shows a sequence of messages for user check in to a hot-desking station or workspace using a user's desk phone with touchscreen in accordance with an embodiment.

Figure 21:
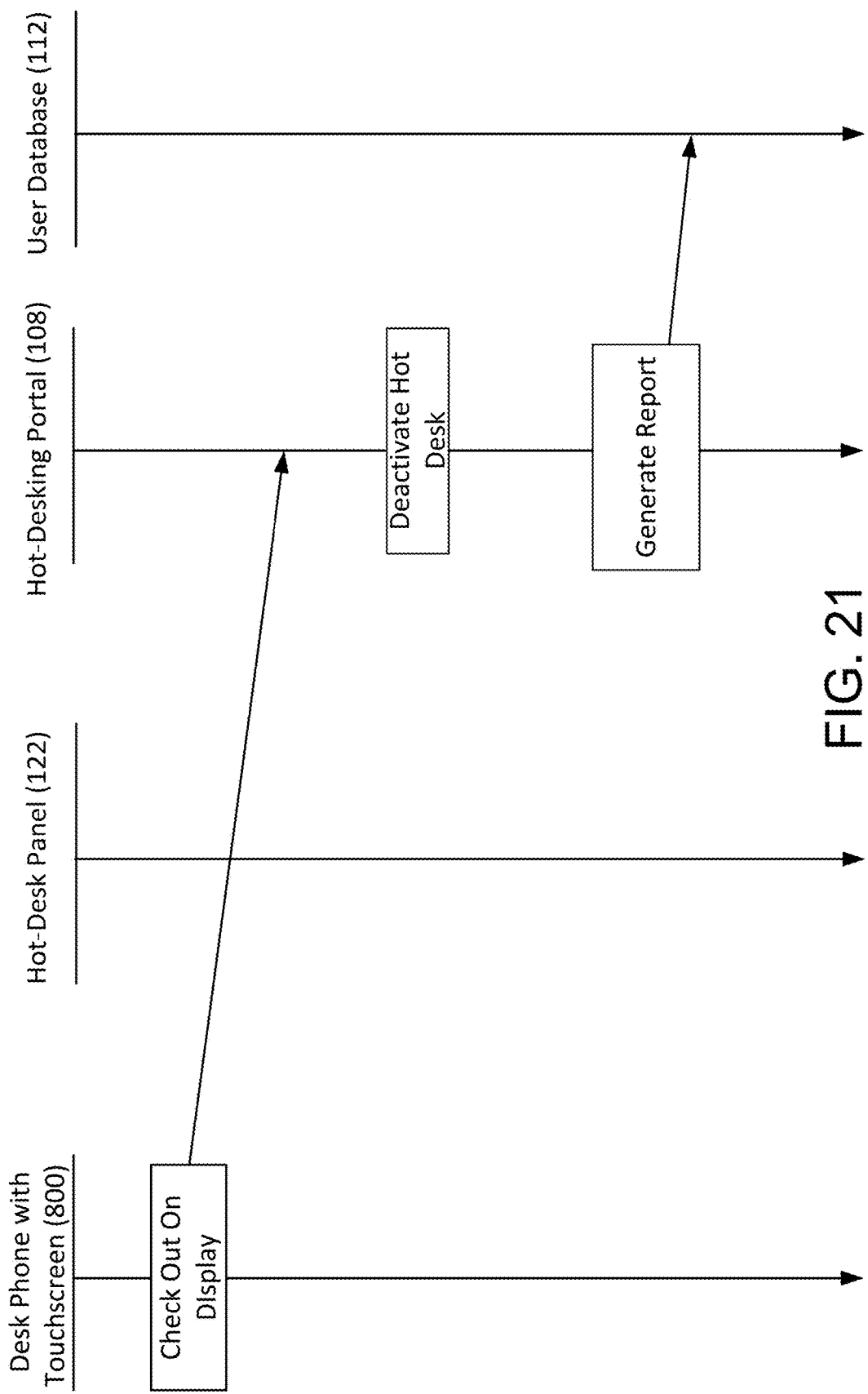

FIG. 21 shows a sequence of messages for user check out from a hot-desking station or workspace using a user's desk phone with touchscreen in accordance with an embodiment.

Figure 22:
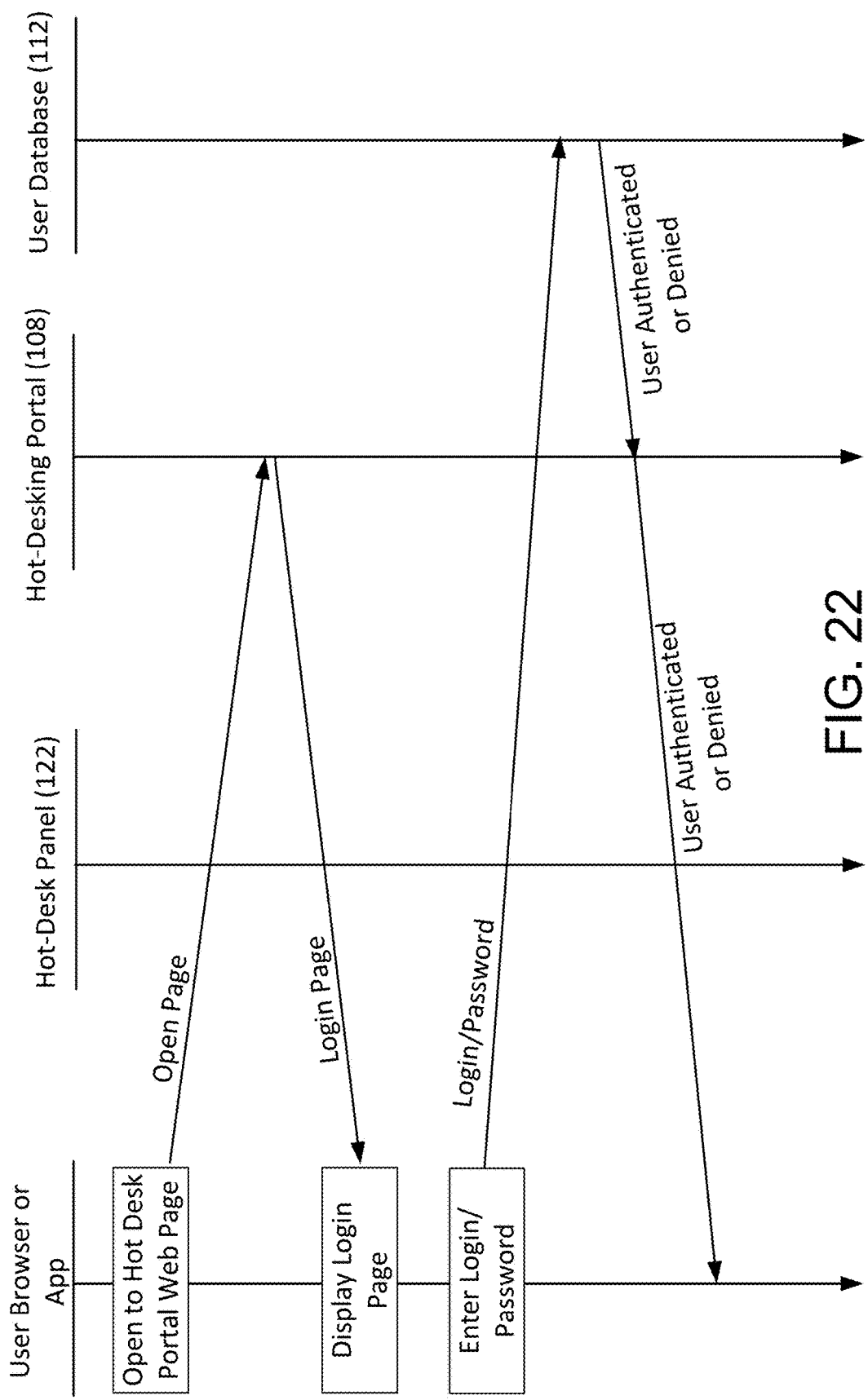

FIG. 22 shows a sequence of messages for logging in a hot-desking station or workspace user directly to a hot-desking portal in accordance with an embodiment.

Figure 23:
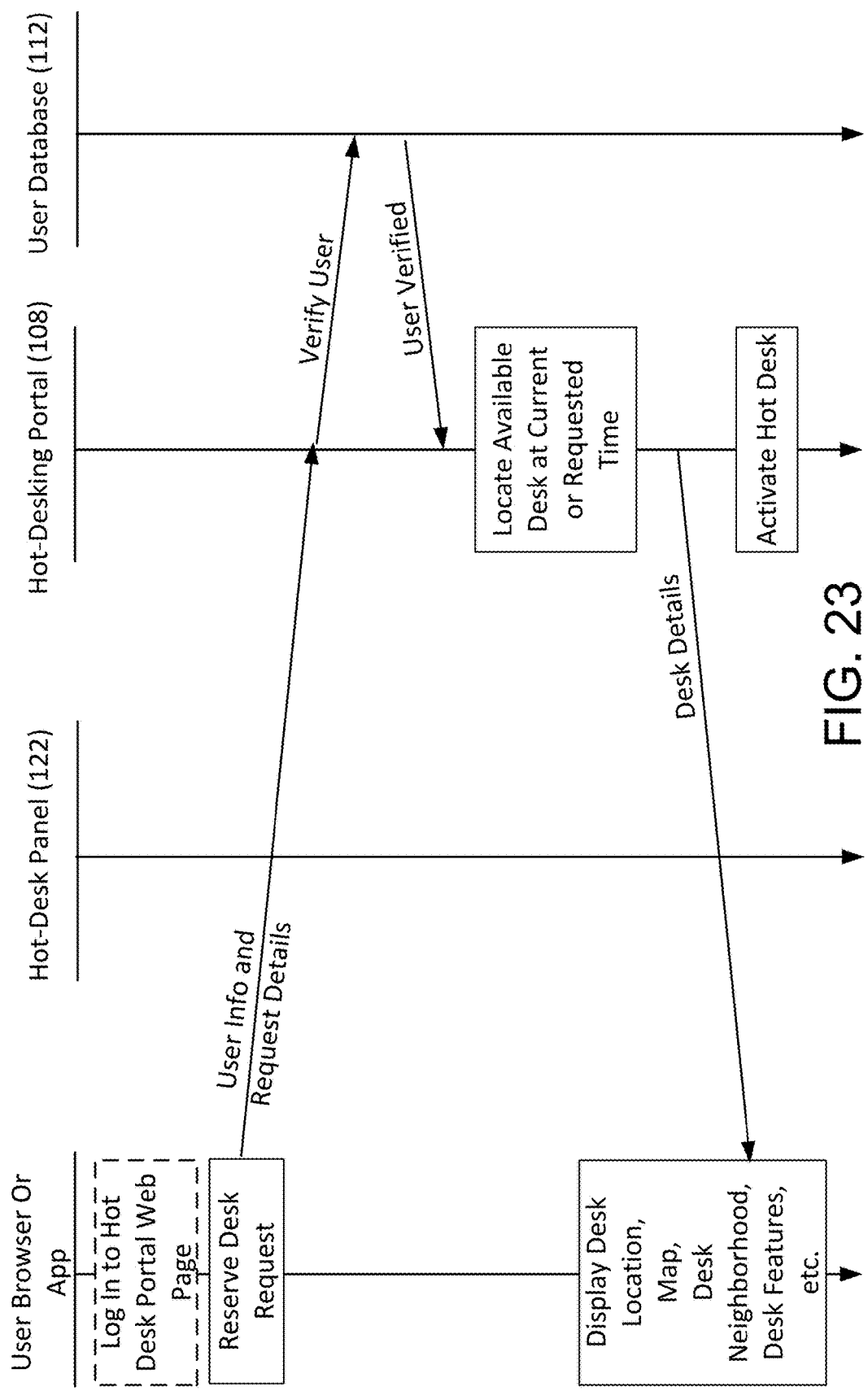

FIG. 23 shows a sequence of messages for reserving a hot-desking station or workspace directly to a hot-desking portal in accordance with an embodiment.

Figure 24:
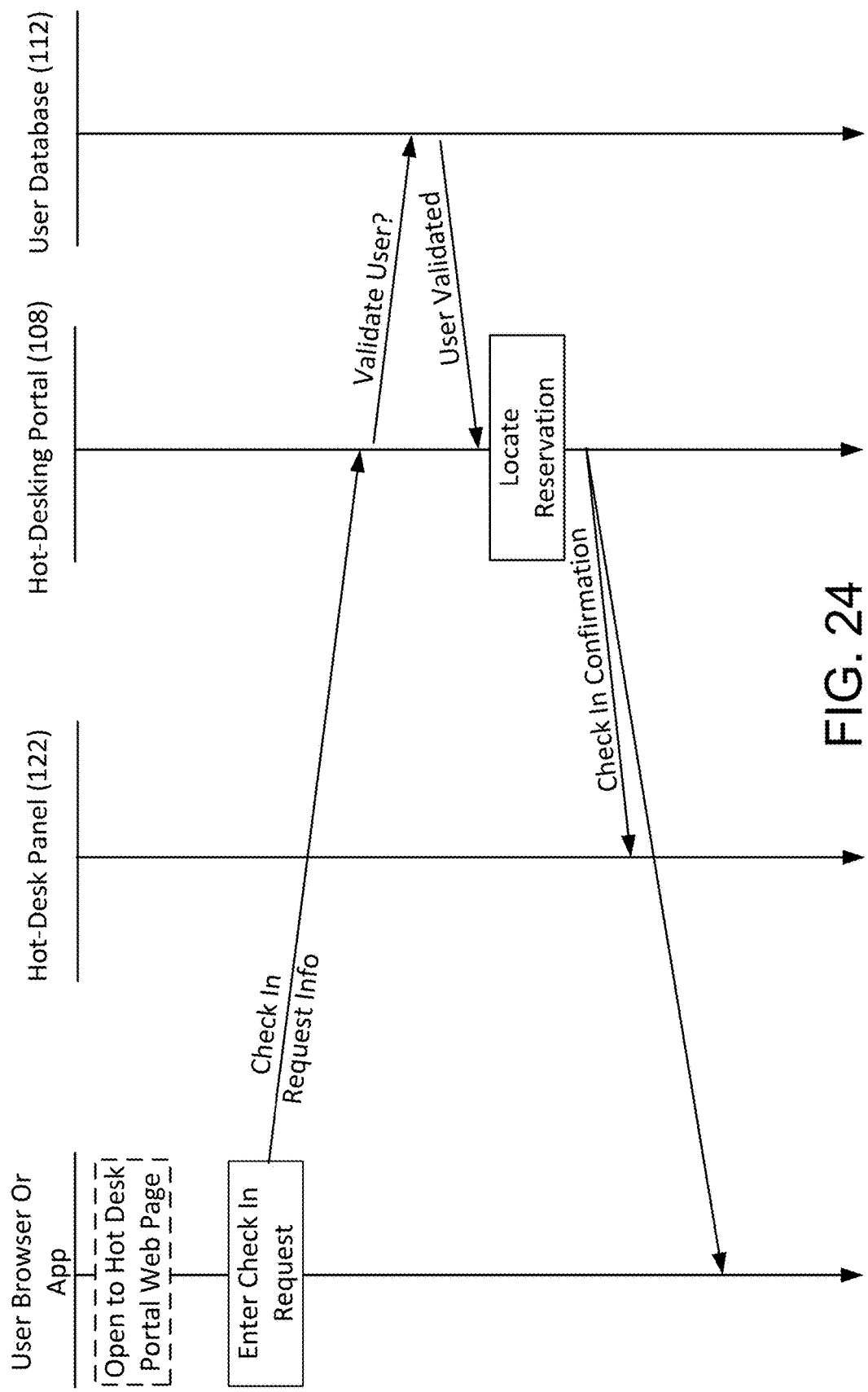

FIG. 24 shows a sequence of messages for user check in to a hot-desking station or workspace directly to a hot-desking portal in accordance with an embodiment.

Figure 25:
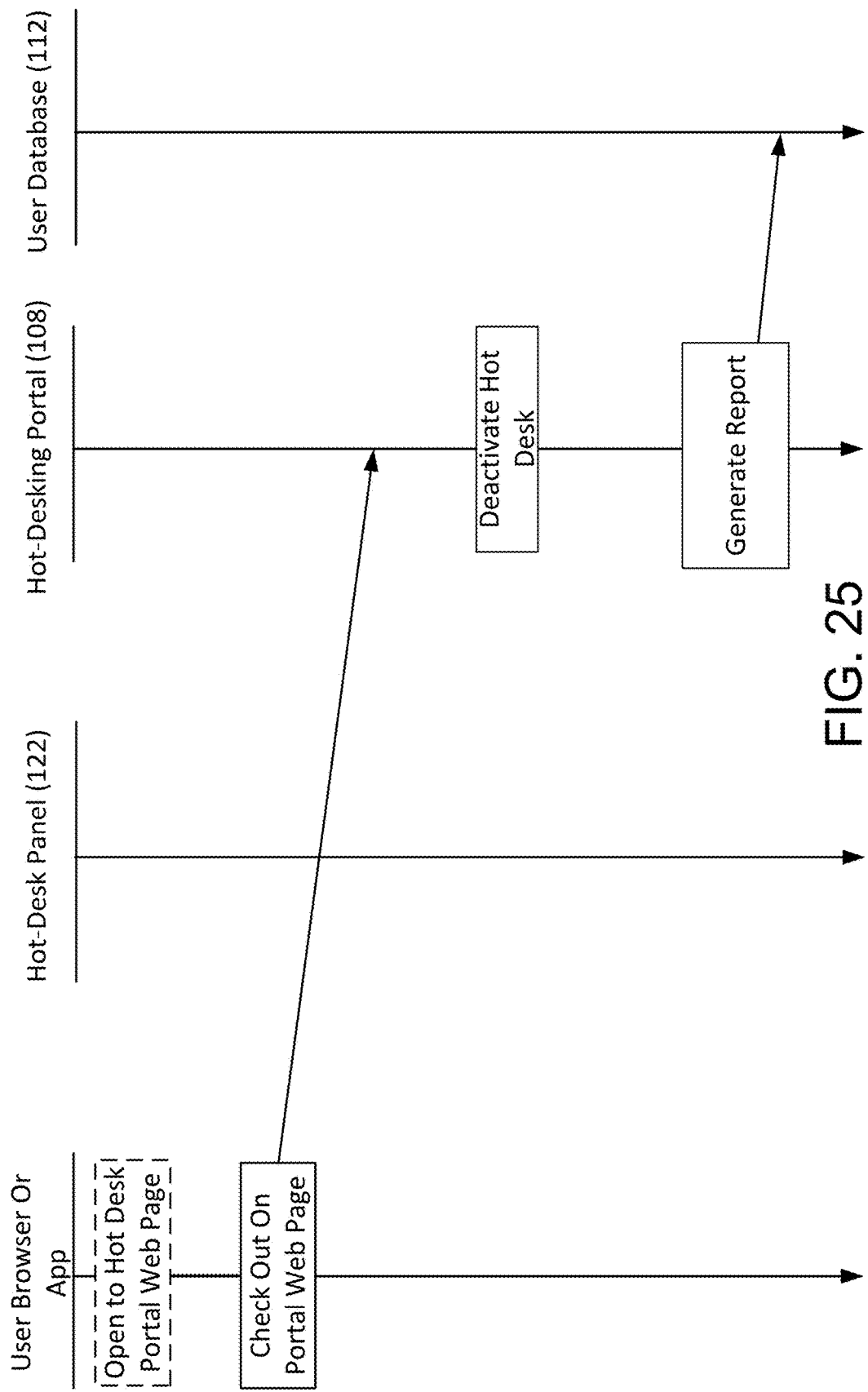

FIG. 25 shows a sequence of messages for user check out from a hot-desking station or workspace directly to a hot-desking portal in accordance with an embodiment.

Figure 26:
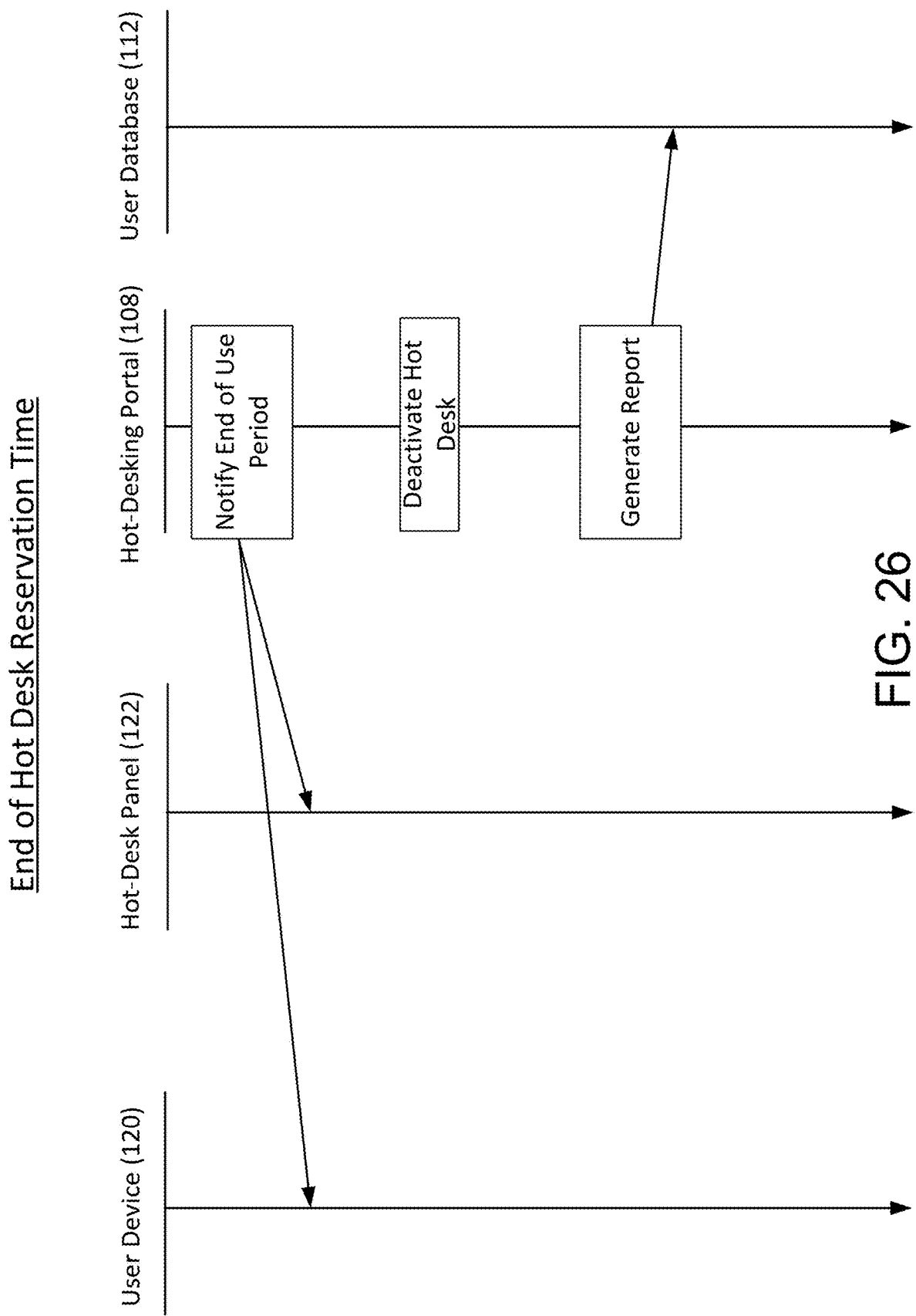

FIG. 26 shows a sequence of messages for ending hot-desking station or workspace use at the end of a reservation time in accordance with an embodiment.

Figure 27:
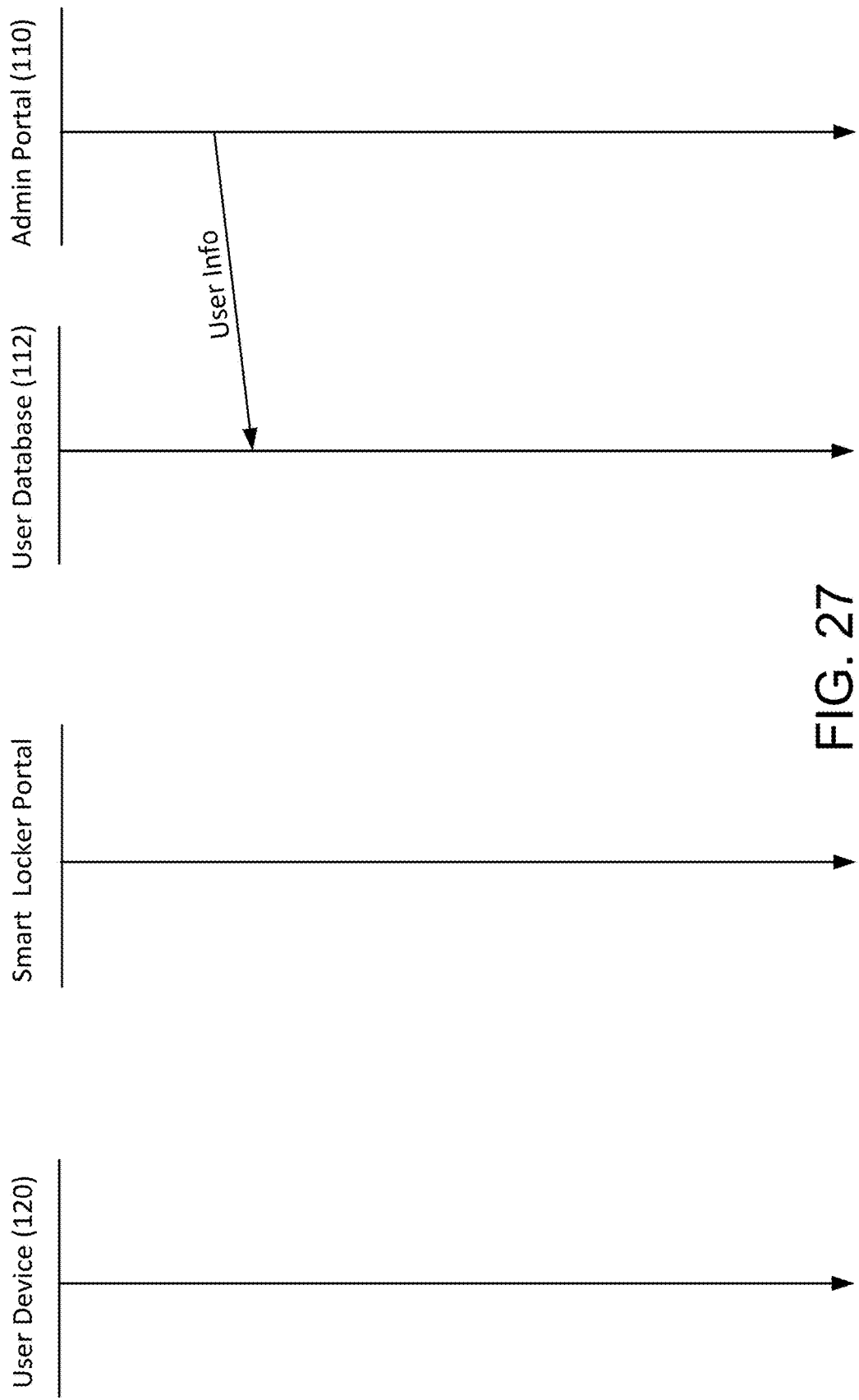

FIG. 27 shows a sequence of messages for assigning a smart locker to a user in accordance with an embodiment.

Figure 28:
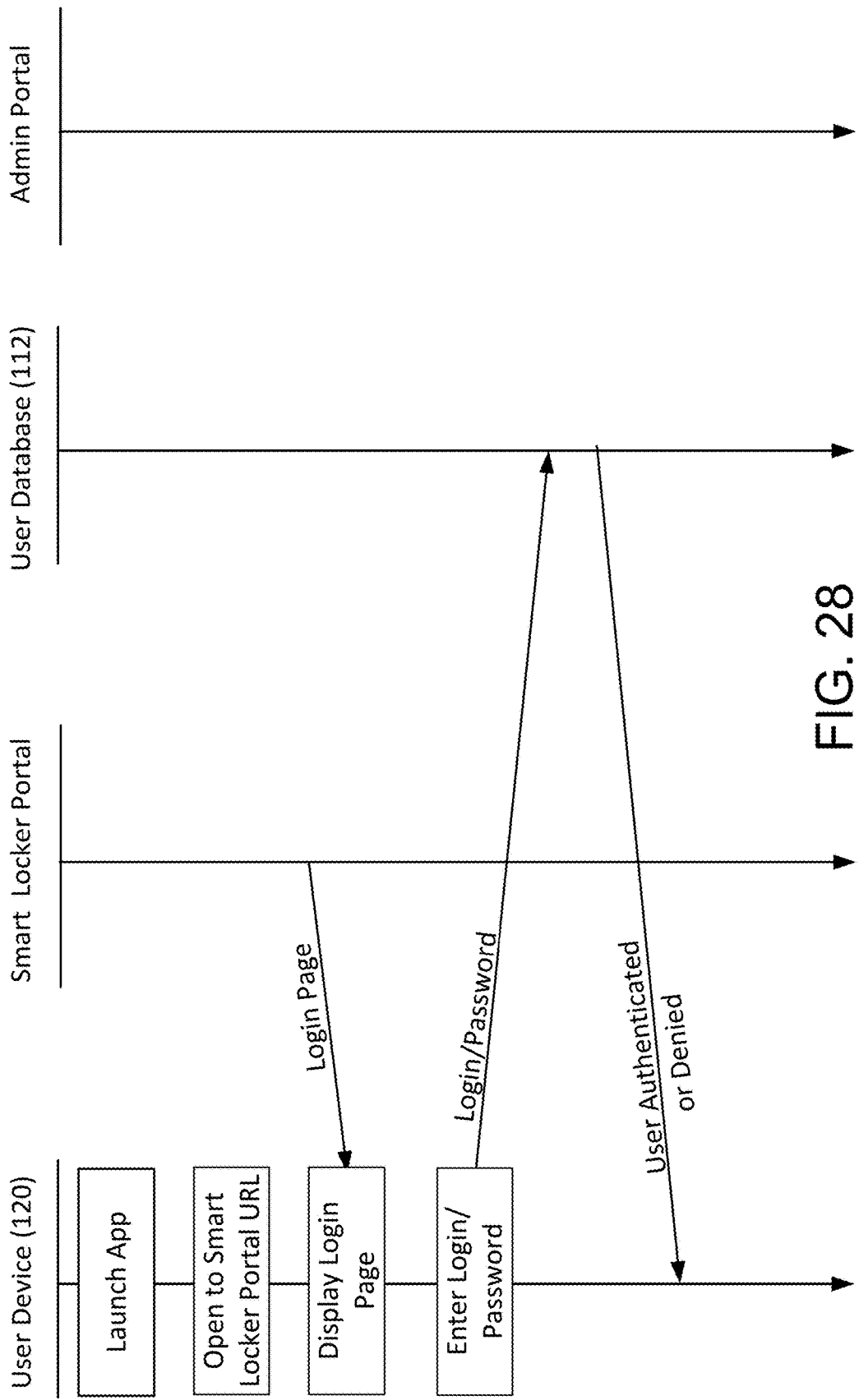

FIG. 28 shows a sequence of messages for logging in to a smart locker portal in accordance with an embodiment.

Figure 29:
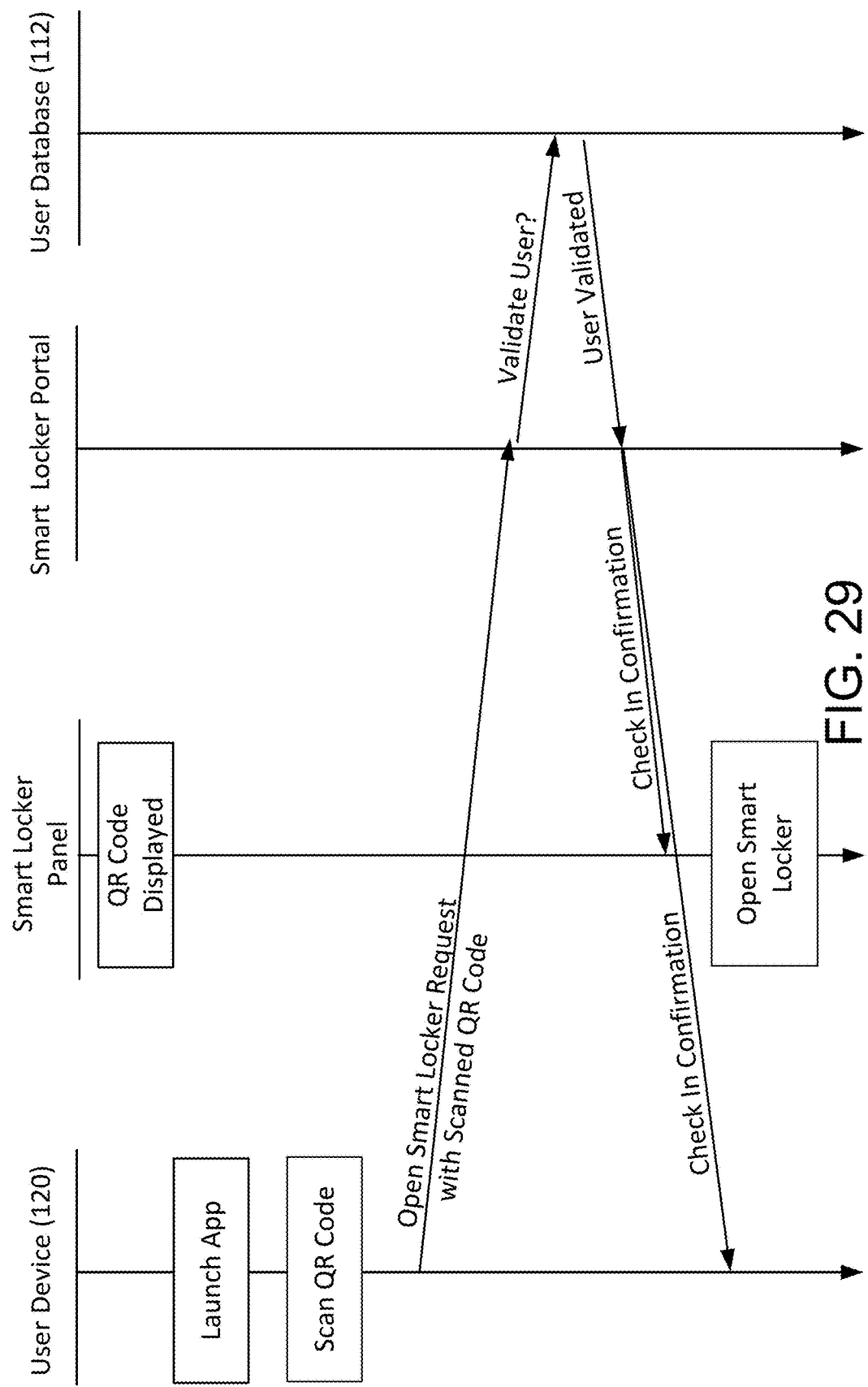

FIG. 29 shows a sequence of messages for opening a smart locker in accordance with an embodiment.

DETAILED DESCRIPTION OF THE INVENTION

The present embodiments provide a hot-desking system, and more specifically to systems, methods, and modes for providing personalized hot-desking, but is not limited thereto. The embodiments of the hot-desking system may be used in small, mid, or large-scale commercial spaces. While the embodiments are described herein as being implemented for commercial facilities, they are not limited to such an implementation. Products for other markets may be built upon the same framework with minimal modification. The present embodiments may be employed in other type of venues or facilities, including in residential, commercial spaces, retail, or nonprofit structures or venues. The system is further designed to be quickly deployable, allowing temporary installations for short-term to be feasible.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

List of Reference Numbers for the Major Elements in the Drawing
The following is a list of the major elements
in the drawings in numerical order.

| | |
|---|---|
| 100 | Hot-Desking System |
| 102 | Hot-Desking Station or Workspace |
| 104 | Docking Station |
| 106 | Network(s) |
| 108 | Hot-Desking Portal |
| 110 | Admin Portal |
| 112 | User Data Base |
| 120 | User Device |
| 122 | Hot-Desk Panel |
| 124 | Hot-Desking Station Telephone |
| 126 | Hot-Desking Station Laptop |
| 224 | Hot-Desk Panel Display Screen |
| 226 | Hot-Desk Panel Status Indicator Light |
| 230 | Two-Dimensional Barcode (2D Code) |
| 400 | Hot-Desk Panel |
| 402 | Wireless Charger |
| 403 | Display Screen |
| 404 | Status Indicator Light Bar |
| 405 | Charging Area |
| 406 | Power Charging Port |
| 407 | Power Input Port |
| 500 | Hot-Desk Panel |
| 503 | Display Screen |
| 504 | Status Indicator Light Bar |

-continued

List of Reference Numbers for the Major Elements in the Drawing
The following is a list of the major elements
in the drawings in numerical order.

| | |
|---|---|
| 505 | Charging Area |
| 600 | Hot-Desk Panel |
| 602 | Wireless Power Charger |
| 603 | Display Screen |
| 604 | Status Indicator Light Bar |
| 605 | Charging Area |
| 607 | Power Input Port |
| 608 | Adjustable Stand |
| 610 | Station Body |
| 611 | Seat |
| 800 | Hot-desk panel Integrated Within Telephone |
| 803 | Display Screen/Touchscreen |
| 804 | Status Indicator Light Bar |

Mode(s) for Carrying Out the Invention

The various aspects of the embodiments described herein pertain to the context of a hot-desking system, and more specifically to systems, methods, and modes for providing hot-desking to users, but is not limited thereto. The embodiments of the hot-desking system may be used in small, mid, or large-scale commercial spaces. While the embodiments are described herein as being implemented for commercial facilities, they are not limited to such an implementation. Products for other markets may be built upon the same framework with minimal modification. The present embodiments may be employed in other type of venues or facilities, including in residential, commercial spaces, retail, or non-profit structures or venues. The system is further designed to be quickly deployable, allowing temporary installations for short-term to be feasible.

Referring first to FIG. 1, a hot-desking system 100 for implementing a personalized workspace environment is shown according to an embodiment. It should be noted that the exemplary embodiment of hot-desking system 100 may be varied in one or more aspects without departing from the spirit and scope of the teachings disclosed herein.

The hot-desking system 100 may include one or more hot-desking stations 102 and docking stations 104, a hot-desking portal 108, an admin portal 110, and a user data base 112, some or all of which may be interconnected over one or more networks 106. A user's personal phone 120, or other portable or personal communication device, may also be connected to the one or more communication networks 106.

The one or more communication networks 106 may incorporate one or more of the Internet, a file transfer protocol (FTP) network, a wide area network (WAN), a local area network (LAN), a personal area network (PAN), a wireless network, a campus area network (CAN), a metropolitan area network (MAN), or the like. The one or more communication networks 108 may include a public switched telephone network (PSTN), a cable telephony network, an Internet Protocol (IP) telephony network, a wireless network, a hybrid Cable/PSTN network, a hybrid IP/PSTN network, a hybrid wireless/PSTN network, or any other suitable communication network or combination of communication networks. In addition, other network embodiments may be deployed with variations in the number and type of devices, communication networks, communication protocols, system topologies, and myriad other details without departing from the spirit and scope of the present embodiments. The one or more communication networks 106 may include one or more gateway devices to interface with the one or more communication networks 106, which may include software and/or hardware components to manage traffic entering and exiting the one or more communication networks 106 and conversion between the communication protocols used by various communication devices.

The hot-desking portal 108 may be hosted via cloud computing as is known in the art. As an example, the hot-desking portal 108 may be hosted on a public cloud platform such as Microsoft Azure, Amazon Web Services, Google Cloud Platform, IBM Cloud, and the like. Such cloud computing platforms typically provide subscribers with various computing elements and functions, such as servers, disk storage, databases and networking, without the need to own and manage the hardware required to carry out such functions.

Alternatively, the hot-desking portal 108 may be a dedicated, private server, employing standard security protocols or may be distributed across multiple computing systems and architectures. Multiple, redundant servers may be provided for additional backup and security. For example, the hot-desking portal 108 may include separate web, app, or email servers. The hot-desking portal 108 may include one or more network interfaces to provide connectivity with, inter alia, user communication device 120, telephone 124, and/or personal device 126. The hot-desking portal 108 provides connectivity with, for example, a building control system and/or a calendar server. The hot-desking portal 108 may include one or more processing units configured for providing processing capability to execute an operating system, run various applications, and/or provide processing for one or more of the processes described herein. The hot-desking portal 108 may further include any one of numerous forms of memory or databases for storing data. The database may be co-located with the hot-desking portal 108 or may be located remotely in various different systems and locations.

The hot-desking portal 108 may include a plurality of software engines for providing the workspace management services discussed herein. Software engines may include a data structuring engine configured for structuring received data in order to establish various relationships, including, but not limited to, data regarding the hot-desking station or workspace 102, data regarding users of communication devices 120, and reservation information. Such data regarding the hot-desking stations or workspaces 102 may include location data, workspace equipment present, and data on the electronic devices located at the hot-desking station or workspace 102, or the like. The software engines may also comprise a data retrieval engine for interfacing with other sources of data. The software engines also comprise the analytics engine configured for analyzing data and a frontend engine configured for providing a visual display through which the end user interacts with the system. For example, the frontend engine may be configured to provide a web-based user interface on the user communication device 120, the hot-desk panel 124, and/or the telephone 800, through which the user interacts with the hot-desking portal 108. Particularly, the frontend engine may include a client-server software application which runs in a web-browser of a client computer, such as one or more user communication devices 120. To that end, the frontend engine may include a web application programming interface (API) which is exposed via the web. In another embodiment, the hot-desking portal 108 may include a proprietary native mobile app in communication with a building management server.

The hot-desking management system 100 may also integrate with a building control system. The building control system may include a plurality of electronic devices adapted to change environmental settings within a building in which the hot-desking station or workspace 102 is located. Such devices may include lighting devices (including, but not limited to, lamps, ballasts, light emitting diode (LED) drivers), shading devices (including, but not limited to, motorized window treatments, dimmable windows), heating and air conditioning (HVAC) devices (including, but not limited to, thermostats, air conditioning units, heating units, filtration systems, fans, humidifiers), sensors (including, but not limited to, occupancy sensors, proximity sensors, sound sensors, microphones, temperature sensors), audiovisual (AV) devices (including, but not limited to, content sources, content sinks, video recorders, cameras, VCR, DVD/DVR, CD player, audio receivers, audio system devices, speakers, telephones, video phones, videoconference codecs (VTC), projectors, projector screens, touch panels, cable television box, television such as plasma, liquid crystal display (LCD), light-emitting diode (LED) flat panel, and cathode ray tube television), security devices (including, but not limited to, security cameras, monitors and door locks), appliances (including, but not limited to, refrigerators, ovens, blenders, microwaves), control devices (including, but not limited to, switches, relays, current limiting devices), industrial devices (including, but not limited to, motors, pumps, chillers, and air compressors). Other types of electronic devices are contemplated depending on building implementation. These various environmental devices may be managed by one or more control system processors.

The hot-desking management system 100 may also integrate with a building management system. As an example, after a user has finished using a hot-desking station and has checked out from the hot-desking station or workspace 102, the hot-desking portal 108 or another element of the hot-desking management system 100 may notify the building management system to request cleaning of the hot-desking station or workspace 102. The hot-desking portal 108 may designate the hot-desking station or workspace 102 as being unavailable for future reservations until the hot-desking portal 108 receives notification from the building management system that the hot-desking station or workspace 102 has been cleaned.

The hot-desking management system 100 may also integrate with an online travel reservation system or travel management system, such as SAP Concur. The hot-desking portal 108, or another element of the hot-desking management system 100, may communicate with the travel reservation system or travel management system to obtain the travel information associated with a user. The hot-desking portal 108, or another element of the hot-desking management system 100, may then, based on the travel information, send notifications to the personal communication device of a user checked in to a hot-desking station or workspace to remind the user of departure times or other travel-related information. Alternatively, the hot-desking portal 108, or another element of the hot-desking management system 100, may send such notifications to the display of the hot-desk panel or to the display of a telephone at the hot-desking station. Additionally, the hot-desking portal 108 or another element of the hot-desking management system 100 may, based on the travel information, reserve a hot-desking station or workspace at the user's travel destination. Such operations may be carried out using a bot, such as a Microsoft Teams bot, operating in conjunction with the hot-desking management system 100. Other scheduling operations of the hot-desking management system 100 may also be executed using a Microsoft® Teams or other bot.

The admin portal 110 may be hosted via cloud computing as is known in the art. As an example, the admin portal 110 may be hosted on a public cloud platform such as Microsoft Azure, Amazon Web Services, Google Cloud Platform, IBM Cloud, and the like. Such cloud computing platforms typically provide subscribers with various computing elements and functions, such as servers, disk storage, databases and networking, without the need to own and manage the hardware required to carry out such functions.

Additionally, the management services provided by the admin portal 110 may be carried out using a provisioning and management service such as Crestron® XiOCloud®, or the like, that allows Crestron® devices and other supported devices across an enterprise to be managed and configured from a central, secure location in the cloud.

Alternatively, the admin portal 110 may be a dedicated, private server, employing standard security protocols or may be distributed across multiple computing systems and architectures. Multiple, redundant servers may be provided for additional backup and security. For example, the admin portal 110 may include separate web, app, or email servers. The admin portal 110 may include one or more network interfaces that provide connectivity. The admin portal 110 may include one or more processing units configured for providing processing capability to execute an operating system, run various applications, and/or provide processing for one or more of the techniques described herein. The admin portal 110 may further include any one of numerous forms of memory or databases for storing data. The database may be co-located with the admin portal 110 or may be located remotely in various different systems and locations.

The admin portal 110 may include a plurality of software engines for providing the workspace management services discussed herein. Software engines may include a data structuring engine configured for structuring received data in order to establish various relationships, including, but not limited to, data regarding the hot-desking station or workspace 102, data regarding users of communication devices 120, and reservation information. Such data regarding the hot-desking stations or workspaces 102 may include location data, workspace equipment present, and data on the electronic devices located at the hot-desking station or workspace 102, or the like. The software engines may also comprise a data retrieval engine for interfacing with other sources of data. The software engines may also comprise an analytics engine configured to analyze data, and a frontend engine configured to provide a visual display through which the end user interacts with the system. For example, the frontend engine may be configured for providing a web-based user interface through which the user interacts with the admin portal 110 using the personal communication device 120, personal computer, or other devices. Particularly, the frontend engine may include a client-server software application which runs in a web-browser of a client computer. To that end, the frontend engine may include a web application programming interface (API) which is exposed via the web. In another embodiment, the admin portal 110 may include a proprietary native mobile app in communication with a building management server.

The user data base 112 may be hosted on a cloud computing or data center employing standard security protocols as are known in the art. Alternatively, the functions of the user data base 112 may reside in a dedicated, private server or may be distributed across multiple computing systems and architectures.

The user data base 112 may be associated with one or more employers, professional organizations, or business organizations, and stores information associated with its employees or members. The user data base 112 may further store information and software needed to personalize a hot-desking station for that employee or member. Such information and software may include the employee's or member's telephone or extension number, and information and software needed to configure the employee's or members personal devices and connect them to services or files provided by the employer, professional organization, or business organization, including data protocols, client-server software, application programming interface (API) software, and graphical user interface (GUI) software and data.

The user communication device 120 may include a smartphone or a tablet and may include wireless charging capabilities adapted to receive power wirelessly from a wireless power charger, as is known in the art. For such implementation, the user communication device 120 may include a wireless power receiver capable of receiving power via induction charging by, for example, the implementation of the Qi wireless charging standard. Alternatively, the user communication device 120 may include one of other portable electronic devices known in the art that conventionally receive power via a wire, such as a smartphone or a tablet without a wireless power receiver, a portable computer such as a laptop, or another computer configured to communicate with a remove server, such as the hot-desking server 108 or the admin server 110, via the one or more communication networks 106 using a web-browser or other similar application. The user communication device 120 may include a central processing unit (CPU), a user interface (e.g., display, keyboard, mouse, or the like), one of various forms of storage (e.g., solid-state memory (random access memory (RAM), read-only memory (ROM), and the like), magnetic memory, such as disc drives, tape storage, and the like, and/or optical memory, such as DVD), and a network interface, as is known in the art.

The user communication device 120 may be further adapted to communicate with the hot-desking server 108 or the admin server 110 via one or more communication networks 106. According to an embodiment, the hot-desking server 108 or the admin server 110 may be accessible to the user communication device 120 via a unique Uniform Resource Locator (URL) and host name. User communication device 120 may access the services provided by the workspace management server 110 using a web-browser, such as Internet Explorer, Microsoft Edge, Firefox, Google Chrome, Opera, Safari, or the like. According to another embodiment, the user communication device 120 may include a proprietary native mobile app, or any other similar software application, configured to communicate with the hot-desking server 108 or the admin server 110 via the one or more communication networks 106.

As FIG. 2 shows, the hot-desking station 102 may include at least one hot-desk panel 122 and one or more of a hot-desking station telephone 124 and a hot-desking station laptop or personal computer (PC) 126, each of which is connected to the docking station 104. The laptop or personal computer (PC) 126 may be provided with the hot-desking station 102 or may be the user's personal device.

The hot-desking station 102 may be one or more of various workspace configurations also known in the art as hot-desking spaces, other dedicated workspaces within an open space concept, cubicles, co-working spaces, semi-private offices, private offices, or the like.

FIGS. 3A-3B show an example of the hot-desk panel 122 according to an embodiment. The hot-desk panel 122 may be a free-standing product adapted to be placed on a surface area such as a desk. Alternatively, the panel may be permanently affixed to, or removably attached to, a desk, such as using a desk mounting bracket or by being recessed into a cavity formed in the desk.

The hot-desk panel 122 may further comprise a display screen 224 adapted to display data to the user. The display screen 224 may include an LCD screen, an LED screen, or other type of screen known in the art. The display screen 224 may further comprise a touch screen capable of receiving user input, such as by displaying soft keys or soft buttons. Alternatively, or in combination with, adjacent hardware keys may be present to be utilized to receive user input.

As FIG. 3A shows, the display screen 224 may display a graphical user interface that includes a two-dimensional barcode (2D code) 230 such as a matrix barcode or QR code. A user may reserve the hot-desking station 102 associated with the hot-desk panel 122, such as by opening and using a user device app on the user communication device 120, by directly using the graphical user interface on the display screen 224 or the hard keys, or by directly accessing the hot-desking portal 108, such as using a browser. The user may then check into hot-desking station 102 using the user communication device 120 to scan the 2D code 230, by directly entering reservation data into the graphical user interface on the display screen 224 of the hard keys, or by directly accessing the hot-desking portal 108 to identify the user and to initiate the check-in process. According to an embodiment, the 2D code 230 may be dynamically generated by the hot-desking portal 108 and sent to hot-desk panel 122 for display. Unique 2D codes may be generated for each particular station 102. Also, for various other applications not linked to hot-desking, other 2D codes may be generated and displayed on the display screen 224, as described herein.

The display screen 224 may further display a status of the hot-desking station 102 indicating whether the station 102 is free for use and the length of time it is available. Also, as FIG. 3B shows, other information may also be displayed, such as the date and time of day as well as, for example, weather information, battery life of a connected user communication device 120 or the like. The display screen 224 may display a schedule for the hot-desking station 102, which for example may be accessed by a user on the user interface in FIG. 3A. According to another embodiment, the 2D code 230 and a schedule may be presented on the same screen. According to another embodiment, the schedule may only be accessible after the user checks into the station 102. The schedule may contain the reservation schedule of station 102 throughout the day. The schedule may be stored, for example, on the hot-desking portal 108 in association with an identification parameter of the station 102 and transmitted to the station 102 for display on the display screen 224. An identification parameter for the station 102 may include a unique identification number assigned to a given station 102, or may be a network address, such as an IP address or a MAC address, or the like. Reservation information may also be displayed for each reserved time period. For example, a user may click on a reserved time period on the screen to review the reservation information, such as the start time, end time, identification information of the user who made the reservation, and the like, though according to another embodiment, the identity of the users making the reservations may remain anonymous.

In a situation where the hot-desking station or workspace 102 is unreserved, the hot-desking portal 108 may generate a 2D code 230 not tied to a reservation and send it to the hot-desk panel 122 for display. According to an embodiment, the 2D code 230 may continue to be displayed by the hot-desk panel 122 until the hot-desking station or workspace 102 is booked, or until the start of the next time when the hot-desking station or workspace 102 is available to be reserved.

During the period that the hot-desking station or workspace 102 is available for booking, a user wishing to reserve the hot-desking station or workspace 102 may scan the 2D code 230 using a camera, such as with a scanner app, of the user communication device 120 to reserve hot-desking station or workspace 102 using the hot-desk panel 122 (via the hot-desking portal 108). According to an embodiment, the user communication device 120 may include the native capability of recognizing the 2D code 230. The 2D code 230 may be encoded with a URL of a website which upon scanning may direct a browser or app on the user communication device 120 to the website. The website may contain a form where the user may enter information, such as an identification number (e.g., an employee ID) associated with the user, a user's first name, a user's last name, or the like. That information may be transmitted from the user communication device 120 to the hot-desking portal 108. The user may then use a schedule displayed on the display screen 224 of the hot-desk panel 122 to select a period during which the hot-desk panel 122 is free. The user reserves the hot-desking station or workspace 102 associated with hot-desk panel 122, for example, by selecting a free time period and/or by indicating the start time and end time of the reservation period. The selected reservation information is then transmitted from the hot-desk panel 122 to the hot-desking portal 108, which may associate the reservation information with the particular hot-desk panel 122 and the user information received from the website. The hot-desking portal 108 may then change the status shown by the hot-desk panel 122 to being booked. The hot-desk panel 122 may also display the booked reservation in its schedule and change the color of its status light indicator 226 from free (e.g., green) to booked (e.g., red).

According to an embodiment, in a workplace environment, the website form implementation may be used by guest users or employees utilizing the personal user communication devices 120. According to another embodiment, the website may allow for authentication of employee users, such as by entering an employee login information (e.g., username or email and password) or via a two-step authentication processes. The hot-desking portal 108 may in turn authenticate and identify the user as an employee. According to an embodiment, the hot-desking portal 108 may store information about a plurality of employee users, including their name, email address, title, department, or the like, as well as information concerning permissions and preferences associated with the user of hot-desk panel 122, as is further discussed below. The hot-desking portal 108 may send employee information to the hot-desk panel 122 for display. For example, the user's name and photograph may be displayed on the display 224 of the hot-desk panel 122 during the period that the hot-desk panel 122 is reserved by the user (e.g., in lieu of a permanent employee plaque). According to another embodiment, the hot-desking station or workspace 102 may contain another display in communication with the hot-desk panel 122 and/or the hot-desking portal 108 adapted to display user employee information to other employees. For example, such a display may be located outside of an office or a cubicle divider.

According to another embodiment, the user communication device 120 may store a proprietary reservation application, or app, adapted to interact with the hot-desking portal 108 to enable reservation of the hot-desking station 102. According to an embodiment, the reservation app may be a standalone app or may be an application framework running inside of another application, such as within a business communication platform (e.g., the Microsoft® Teams business communication platform) or the like. A user employee may download the reservation application and login via the reservation application using the employee's login credentials. To make a reservation of the hot-desking station or workspace 102 associated with the hot-desk panel 122, the user may use a tool within the application to scan the 2D code 230. The 2D code 230 may, for example, contain a unique identification number that is associated with the identification information of the hot-desk panel 122 by the hot-desking portal 108. The reservation application may communicate with the hot-desking portal 108 to transmit the data extracted from the 2D code 230 along with the user identification information. The user may then proceed with reserving the hot-desking station 102 as discussed above.

According to another embodiment, the hot-desking station or workspace 102 may be limited to use by a particular group of employees, such as a particular department within a company. A dynamic 2D code 230 generated by the hot-desking portal 108 may be associated with that department and particularly with the user employees of that department such that only the associated department employees are able to utilize the displayed 2D code 230 to make workspace reservation via hot-desk panel 122. All other employees and guests may be restricted from reserving the workspace. For example, an error message may be displayed via the user communication device 120 and/or hot-desk panel 122. According to another embodiment, a particular hot-desk panel 122 may be limited to use by an individual employee or particular employees during specific assigned periods. For example, a dynamic 2D code 230 may be generated that is associated only with the particular employee or employees that may use the hot-desk panel 122. As an example, a particular dynamic 2D code 230 may be generated for an employee A for display on a particular hot-desk panel 122 of a particular hot-desking station or workspace 102 on Mondays and Tuesdays, and another 2D code 230 may be generated for an employee B for display on the particular hot-desk panel 122 of the particular hot-desking station or workspace 102 on Wednesdays and Thursdays.

According to an embodiment, in a workplace implementation, an employee user may reserve a hot-desking station 102 ahead of time. For example, the user may use a calendar software installed on a user communication device 120, or on a desktop computer, to create a reservation, for example using Microsoft® Outlook calendar software. Each hot-desking station or workspace 102 may be displayed to the user as a selectable workspace object, which may be listed in a list of workspaces or displayed on a floor-map. Workspace objects may be identified by names, such as, "hot-desking station or workspace 102 at 7 Volvo, second floor". Each such object may be associated with a hot-desking station or workspace 102 by the hot-desking portal 108. Using calendar software, the user may enter reservation information by selecting an available workspace object as well as a start time and an end time for the reservation. The reservation information, including the user's identifying information, may be transmitted to the hot-desking portal 108 and displayed on the display screen 224 of the reserved hot-desk panel 122.

According to an embodiment, at the time when the hot-desking station or workspace 102 is reserved, the hot-desking portal 108 may generate a unique reservation 2D code 230 associated with the reservation. During the period when the hot-desking station or workspace 102 is reserved, the reservation 2D code 230 may be displayed via the display screen 224. The reservation information may also be displayed on display screen 224 and the light indicator 226 may light up to indicate that the hot-desking station or workspace 102 is reserved, such as by displaying the color red. The employee user arriving at hot-desking station or workspace 102 may then scan the reservation 2D code 230 and be authenticated to check-in in the manner discussed herein. According to an embodiment, a user that has not made a reservation that attempts to check-in during the reserved period, such as by scanning the 2D code 230, may be shown a message on the display screen 224 and/or on the user communication device 120 indicating that the hot-desking station or workspace 102 is reserved by another user and that the check in was unsuccessful. Since the dynamic 2D code 230 may be specific to the reservation, only the user who made the reservation may be able to use the 2D code 230 to check-in at the hot-desk panel 122.

According to another embodiment, when making the reservation, the hot-desking portal 108 may also issue specific reservation credentials, such as a reservation PIN. Upon the user communication device 120 scanning the 2D code 230 (for example without using a proprietary reservation application), the user may be presented with a form, via a website, asking the user to enter the reservation credential to verify the user and to check-in the user.

According to another embodiment, instead of using a 2D code 230, a user may check-in and be identified at the hot-desk panel 122 using other technologies known in the art, such via Bluetooth, NFC, RFID, or the like. According to another embodiment, the wireless power receiver of the user communication device 120 may transmit data to a wireless power transmitter of the hot-desk panel 122 via analog pulses, digital pulses, optical data transmission, electromagnetic induction, or the like. In either of the above discussed implementations, the user communication device 120 may transmit data to the hot-desk panel 122, for example containing user identification information, reservation information, or similar data to the hot-desk panel 122 to enable user identification for workspace booking or check-in.

The hot-desk panel 122 of the present embodiments may further be used in a remote and/or from home environment. It may be used by employee users to check-in and check-out to work from home. The time that the user checks-in and checks-out may be transmitted from the hot-desk panel 122 to the hot-desking portal 108 and used for employee timestamp purposes. To communicate with the hot-desking portal 108, the hot-desk panel 122 may connect to the Internet via the user's local area network, such as via Ethernet or Wi-Fi. The user may be designated as "checked-in" only when hot-desk panel 122 detects that a user communication device 120 is present in a wireless charging area via a wireless power transmitter of the hot-desk panel 122 or when a user communication device 120 is connected to the wired power port 206. In addition, the 2D code 230 of the hot-desk panel 122 located on user employee's desk may dynamically and periodically change (e.g., daily) requiring the employee to daily scan the 2D code 230 to check-in for a workday.

The present embodiments may also enable monitoring of the number of users and the identity of the users present in a building, floor, or an open floor workspace at any particular time of the day, allowing allows management to know where its employees are located in an agile workspace environment. This enables, for example, identification of employee location within buildings during emergency situations for evacuation purposes.

Because the hot-desk panel 122 is integrated with the hot-desking portal 108 and may be further integrated with a building control system, and/or other systems known in the art, checking-in or reserving the hot-desking station or workspace 102 via hot-desk panel 122 may trigger one or more events. Such events may be trigged for all users checked-in at a hot-desking station or workspace 102 regardless of the user identity, or the events may vary depending on the identity of the checked-in user based on user permissions or preferences. User may be assigned permissions stored by the hot-desking portal 108 in association with user identification. Such permissions may vary based on the user department, title, or the like. The user may set user preferences, for example using the reservation application discussed above, or another application. The hot-desking station or workspace 102 may be equipped with one or more electronic devices that may activate upon proper authentication of the user. The hot-desking portal 108 may further maintain workspace information associated with each hot-desking station or workspace 102, including, but not limited to, the location of the hot-desking station or workspace 102 within a building, the department (or team) to which the hot-desking station or workspace 102 belongs (if any), access levels to the hot-desking station or workspace 102, and available resources such as the equipment present at each hot-desking station or workspace 102, identification of controllable environmental conditions at the hot-desking station or workspace 102, or the like.

According to an embodiment, a triggered event may include the unlocking of and switching on power provided to one or more power supplies, such as receptacles, located at the hot-desking station or workspace 102 and which may be controlled by the hot-desking portal 108. The docking station 104 may be equipped with a switchable power distribution unit (PDU) that is controlled the hot-desking portal 108. The switchable PDU may control one or more power receptacles.

According to another embodiment, the hot-desking station or workspace 102 may contain a desk equipped with a cable management system, such as a FlipTop cable management system available from Crestron Electronics, Inc., recessed into the desk and containing power and network connections. The cable management system may be connected to the docking station 104 or other switchable PDU for power control. Another action may unlock network access, either wired or wireless. The hot-desk panel 122 equipped with Bluetooth may for example transmit Wi-Fi access token to the user communication device 120. For wired connections, checking-in may unlock network connection ports available at the hot-desking station or workspace 102, for example by the FlipTop cable management system. Network connection may also be provided based on user permissions. For example, guest users may only be allowed limited access to a guest network, whereas properly authentication employees may be allowed full access to the corporate network. Once reservation has expired, or the user checks-out, power and network availability may be turned off.

The hot-desking station or workspace 102 may further be equipped with a telephone 124 which may be activated by the hot-desking portal 108 upon user check-in at the hot-desk panel 122. According to an embodiment, the telephone 124 may run a communication application (such as Microsoft Teams). Proper authentication of the user may automatically log the user into the user account via the communication application run on the telephone 124. Particularly, the hot-desking portal 108 may transmit user login credentials to the telephone 124 associated with the hot-desk panel 122. As such, the user may receive incoming calls directly at the checked-in hot-desking station or workspace 102. After the completion of the reservation period, the user may be logged out of the telephone 124. Alternatively, the user may use hot-desk panel 122 to check out sooner.

According to another embodiment, the user check-in may also allow and trigger an automatic pairing of the user's devices with the equipment at the hot-desking portal or workspace 102 based on the user's permissions stored at the hot-desking portal 108 or at the user database 112. For example, the user may bring and utilize the user's own Bluetooth headset that may be automatically paired with the telephone 124 by automatically triggering a Bluetooth handshake. According to an embodiment, the hot-desking portal 108 may maintain pairing information for the user's headset. That information may be passed from the hot-desking portal 108 to the telephone 124 upon successful authentication. The telephone 124 may then automatically pair to the headset. Pairing information exchanged between the devices may be maintained by the telephone 124 and headset while the user is checked-in at the hot-desk panel 122. However, when the reservation is terminated, or the user checks-out, the headset is unpaired from the telephone 124 and pairing information is erased from the telephone 124 and the headset.

FIGS. 4A-4C show another example of a hot-desk panel 400 according to another embodiment. The panel 400 may be a free-standing product adapted to be placed on a surface area such as a desk. Alternatively, the panel may be permanently affixed to, or removably attached to, a desk, such as using a desk mounting bracket or by being recessed into a cavity formed in the desk. The panel 400 may include a wireless power charger 202, such as an induction charger, that includes a wireless power transmitter. The wireless power charger 402 may transmit power via the implementation of the Qi wireless charging standard. The panel 400 may include a charging area 405 upon which the user may place the user communication device 102 for charging, such as a circular plate-like surface area 405. The panel 400 may be connected to a power supply to receive power via a power port 407. According to one embodiment, the panel 400 may be connected to an AC outlet via an external power supply or an AC adapter that converts AC to DC. For example, the power port 407 may include a barrel power connector, as is known in the art. Alternatively, an AC adapter may be integrated within the station unit. According to another embodiment, the panel 400 may include a power over Ethernet (POE) port 407 adapted to receive power via Ethernet cabling. The power supply provides power to the panel 400 components, including the wireless power charger 402, and thereby provides power to the user communication device 120 to charge the device.

The panel 400 may further comprise a display screen 403 adapted to display data to the user. The display screen 403 may include an LCD screen, an LED screen, or other type of screen known in the art. The display screen 403 may further comprise a touch screen capable of receiving user input. Alternatively, or in combination with, adjacent buttons may also be utilized for user input. According to an embodiment, the display screen 403 may be positioned over and centered within the charging area 405 as shown in FIG. 4.

Alternatively, a hot-desk panel 500 includes a display screen 503 that may be positioned in proximity to a charging area 505 as shown in FIG. 5.

Referring back to FIG. 4, the panel 400 further comprises a status bar 404 for status indication. The status bar 404 may include one or more light sources, such as LEDs, and a light diffuser for diffusing light. For example, status bar 404 may include an external ring as shown in FIG. 2 for circular form factor.

The panel 400 may include a wired power charging port 406, such as an USB, USB-C, mini-USB, micro-USB, or similar ports known in the art. User communication devices 120 without wireless power receiving capabilities may be connected to the wired power charging port 406 for receiving power from the panel 400. Also, a user may simultaneously use the wireless charger 402 to charge a smartphone and the wired power charging port 406 to charge a laptop or other devices. The panel 400 may further comprise a processor, a memory, and a communication interface therein for communication with the hot-desking portal 108 over the communication network 106. Also, the panel 400 may include a POE port adapted to receive both power and data. Further, the panel 400 may include a wireless interface, such as Wi-Fi, Bluetooth, NFC, or similar interface for wireless communication with the user communication device 120.

FIG. 6 shows a perspective view, and FIGS. 7A-7B show front and side views, respectively, of a hot-desk panel 600 according to yet another embodiment. The hot-desk panel 600 may include a rectangular upright station body 610 connected to an adjustable stand 608 such that the body may swivel to different upright positions with respect to the stand 608. The hot-desk panel 600 may include a seat 611 on which the user communication device 120 may rest. The hot-desk panel 600 may include substantially the same components as the panel 400, including a wireless power charger 602 adapted to charge a user communication device 120 placed on a charging area 605, a wired power charging port 606, a display screen 603, a status bar 604, and a power supply port 607. According to an embodiment, the status bar 604 is located at a top end of the station body 610 and is adapted to provide a substantially 360° view.

According to a further embodiment, a hot-desk panel may be integrated within a telephone 800, as FIG. 8 shows. The telephone 800 may include a display screen 803 adapted to display the dynamic 2D code to allow the user to check-in or reserve a workspace via the telephone 800 in substantially the same manner as described herein. The telephone 800 may also be equipped with a wireless power charger 802 containing a charging area to provide power to the user communication device 120 in the manner discussed above. A wired power charging port 806 may also be provided for charging a user communication device 120. The telephone 800 may also contain a status light indicator 804 that functions in the manner discussed above.

According to further embodiments, checking-in or reserving using a hot-desk panel 122 may trigger the hot-desking portal 108 to cause a building control system to change environmental settings at the hot-desking station or workspace 102. Using the reservation application, or another application or a web browser, a user may input personal preferences, including, but not limited to, lighting conditions, temperature settings, shading settings, volume settings, or the like. These personal preferences may be stored at the hot-desking portal 108 or at the user database 112 in association with the user identification information. Upon checking in, the hot-desking portal 108 may communicate these settings or preferences to the building control system.

The building control system may determine which control or controllable electronic devices are associated with the reserved hot-desking station or workspace 102 and change the settings of such devices based on the received user preferences. Accordingly, the environmental settings of the hot-desking station or workspace 102 may be adjusted based on preferred working environment of the user.

While the present embodiments were discussed with reference to a workspace, hot-desking may be implemented in other types of environments, including, but not limited to, residential spaces, hotels, education facilities, or the like, for other uses.

For example, in a hotel environment, the hot-desking stations 102 may be provided in different locations throughout the hotel, enabling a user who has booked a hotel room to also have power access, network access, and control of preferred environmental settings, or the like. The hot-desk panel 122 and the telephone 124 (or integrated station 800) may further be located within the hotel room to provide phone services, network access, power access, and control of preferred environmental settings within the hotel room. Checking-in may allow different guest permissions, for example, different phone communications levels based on the communication services purchased by the hotel guest, including making calls only within the hotel, making outside calls, or making distance calls.

The hot-desk panel 122, 400, 500 or 600 or the integrated station 800 may also be used in residential applications besides working from home environments. For example, the station 600 may be used at a user's bedside to provide phone charging as well as to display information via the screen 603. The unit may be freestanding and the user may lean the user communication device 120 against the charging surface 605 of the wireless power charger 602. The display 603 may display the date and the time of day as well as the user's schedule. The hot-desk panel 122, 400, 500 or 600 or the integrated station 800 may integrate with a residential building control system 106 to transmit and receive commands, such as with Crestron Home control system for home automation. According to an embodiment, the station 600 may detect that a phone 102 is present on the charger and change environmental setting of the room based on the presence of the phone 102. According to another embodiment, the station 600 may identify whether a building control application is running on the phone 102 or identify the user identity, for example via Bluetooth or NFC or similar pairing, and trigger the residential control system to change environmental settings based on the user's preferences. For example, if located at bedside, where a phone is typically placed before going to sleep, the environmental settings may change to evening preferences, such as dimming of the lights, turning on relaxing music, turning down the heat, or the like.

FIGS. 9-26 illustrate the actions and the messages exchanged within the various portals and systems of the hot-desking system 100 according to various embodiments.

FIG. 9 shows an example of the messages exchanged within an embodiment of the hot-desking system 100 when setting up a user of the hot-desking system. More specifically, information pertaining to a user may be entered via the admin portal 110 into the user database 112.

FIG. 10 shows an example of the messages exchanged within an embodiment of the hot-desking system 100 when a user logs in using a hot-desking app stored in the user's personal communications device 120.

The hot-desking portal 108 then accesses the user database 112 and looks up whether the received user login and password is stored in the user data base 112 as a valid login and password. If the login and password are found in the data base 112 and are valid, then the hot-desking portal 108 logs in the user. The hot-desking portal 108 then transmits a message over the one or more networks 106 to the hot-desking app running on the user's personal communications device 120 indicating that user has been authenticated.

Alternatively, if the login and password are not found in the user data base 112 or are stored in the user data base 112 but not as a valid login and password, then then the hot-hot-desking portal 108 does not log in the user. The hot-desking portal 108 then transmits a message over the one or more networks 106 to the hot-desking app running on the user's personal communications device 120 indicating that user has not been authenticated and user access is denied.

FIG. 11 shows an example of the messages exchanged within an embodiment of the hot-desking system 100 when a user reserves a hot-desk or workspace 102 using the hot-desking app stored in the user's personal communications device 120.

First, if not already open, the user opens the hot-desking app stored in the user's personal communications device 120. Depending on the security requirements of a given hot-desking portal 108, the user may be required to log in, as described in FIG. 10, each time the hot-desking app is opened or accessed. Alternatively, the user may only need to log into the hot-desking portal 108 the first time the hot-desking app is opened or accessed.

Next, using the hot-desking app, the user enters a request to reserve a desk. The user may then be required to enter the time and date desired. The user may also be required to enter information indicating the preferred location of the desk. Depending on the options available to the user, such location information may be as specific as a given desk or desks within a particular area of a specific building or adjacent to a particular group of other users. As an example, an employee that generally works in a particular building may make such a specific location request. Alternatively, the location specified may be as general as a particular city, state and/or country. For example, a user may make such a request in conjunction with travel to particular city, state and/or country.

The user may also be required to enter information indicating the amenities needed, such as the type of display needed, whether a laptop is needed or being provided by the user, the type of telephone needed, whether a printer is needed and the kind needed. For example, someone in a design position may require a display and printer better suited for graphics, whereas an employee doing more clerical type work may have other work needs.

Alternatively, some or all of the above information may be held in a user profile stored in one or more of the hot-desking app on the user's personal communications device 120, the, and the user data base 110, thereby reducing or the amount of information that need be entered in conjunction with the reservation request. Additionally, information regarding the user's job and position may be stored in one or more of the hot-desking app on the user's personal communications device 120, the hot-desking portal 108, and the user data base 110, so that the information associated with the type of work done in that position is also used in the reservation request.

After the user initiates the request for a hot-desk or workspace, the hot-desking app on the user's personal communications device 120 then transmits the request over the one or more networks 106, together with any of the information described above, to the hot-desking portal 108.

The hot-desking portal 108 then accesses the user data base 110, using some or all of the received request information to verify that the user has permission to use a hot-desk or workspace at the requested location as well as whether the user has permission to use the particular facilities and amenities requested.

In response to the hot-desking portal 108 verifying the user's request, the hot-desking portal 108 then searches for an available hot-desk or workspace. Depending on the user's request, the hot-desking portal 108 may search for a hot-desk or workspace that is currently available at the requested location or a hot-desk or workspace that will be available at the requested location at a requested date and time.

Upon locating an available desk, the hot-desking portal 108 then transmits, over the one or more networks 106 to the hot-desking app on the user's personal communications device 120, information providing details of the reserved hot-desk or workspace. Such information may include the desk, cubicle, or room number, and the location, floor and neighboring workers or facilities within the building. For more remote reservations, the information may include the building address as well as the city, state, and/or country where the building is located. Moreover, a map showing location within the building of the reserved hot-desk or workspace may be provided and/or a map showing the location of the building where the reserved hot-desk or workspace is located. Other information may include the facilities and amenities associated with the reserved desk, such as the type of display needed, whether a laptop is needed or being provided by the user, the type of telephone needed, whether a printer is needed and the kind needed.

In conjunction with the hot-desking portal 108 verifying the user request and locating a hot-desk or workspace 102, as described above, the hot-desking portal 108 also reserves that hot-desk or workspace 102 for the user for the prescribed period. The hot-desking portal 108 also activates and configures the reserved hot-desk or workspace 102. Such activation may include activating one or more features, inputs, outputs, and/or ports of the docking station 104 depending on the facilities to be made available to the user. For example, the hot-desking portal 108 may control the docking station 104 to provide power to one or more monitors, printers, and/or other peripherals to the user depending on the requirements of the particular user. The hot-desking portal 108 may also as control the docking station 104 to provide data connections to one or more physical networks, HDMI ports, and USB ports may be made available to the user depending on the requirements of the particular user. Alternatively, the hot-desking portal 108 may control the docking station 104 to disable particular power and/or data ports to deny specific devices or data connections to the user.

Alternatively, the hot-desking portal 108 activates and configures the reserved hot-desk or workspace 102 upon the user checking in.

Additionally, in conjunction with the hot-desking portal 108 verifying the user request and locating a hot-desk or workspace 102, the hot-desking portal 108 may also activate the hot-desk panel 122, 400, 500 or 600 of the hot-desk or workspace 102 or the display 803 of the telephone 800 of the hot-desk or workspace 102, or may change an existing display on the panel to reflect that the hot-desk or workspace 102 has been reserved. The hot-desk panel 122, 400, 500 or 600 of the hot-desk or workspace 102 or the display 803 of the telephone 800 of the hot-desk or workspace 102 may also provide messages indicating that the hot-desk or workspace 102 has been booked, is clean, dirty, occupied or available. The hot-desk panel 122, 400, 500 or 600 of the hot-desk or workspace 102 or the display 803 of the telephone 800 of the hot-desk or workspace 102 may also display the location of the hot-desk or workspace 102, the time of day, and/or the users who have reserved that hot-desk or workspace 102 together with the time and/or day booked.

The hot-desk panel 122, 400, 500 or 600 or the display 803 of the telephone 800 also displays a 2D code 230 in conjunction with the hot-desking portal 108 booking that hot-desk or workspace 102. The 2D code may be generated for a particular hot-desk or workspace 102, may be generated for a particular hot-desk or workspace 102 for a given date or time, or may be newly generated each time a hot-desk or workspace 102 is booked.

Also, in conjunction with the hot-desking portal 108 verifying the user request and locating a hot-desk or workspace 102, the hot-desking portal 108 may also change the color of the LED indicator light 226, 404, 504 604 of the hot-desk panel 122, 400, 500 or 600 and/or the LED indicator light 804 the telephone 800 to reflect the change of status of the hot-desk or workspace 102. For example, different colors may correspond to whether that hot-desk or workspace 102 has been booked, is clean, dirty, occupied or available.

FIG. 12 shows an example of the messages exchanged within an embodiment of the hot-desking system 100 when a user checks in at the reserved hot-desk or workspace 102 using the hot-desking app stored in the user's personal communications device 120.

First, if not already open, the user opens the hot-desking app stored in the user's personal communications device 120. Depending on the security requirements of a given hot-desking portal 108, the user may be required to log in, as described in FIG. 10, each time the hot-desking app is opened or accessed. Alternatively, the user may only need to log into the hot-desking portal 108 the first time the hot-desking app is opened or accessed.

Next, using the QR reader app on the user's personal communication device 120, the user scans the 2D code on the display of the hot-desk panel. The hot-desking app stored in the user's personal communications device 120 then transmits a check in request, together with the scanned 2D code data, over the one or more networks 106 to the hot-desking portal 108.

The hot-desking portal 108 may then access the user data base 110, using some or all of the received request information to again verify the user, and in response to the user being validated, locate the reservation using the 2D code data and check in the user. Alternatively, the hot-desking portal 108, after receiving the check in request and the scanned 2D code data, simply locates the reservation using the 2D code data and checks in the user without again verifying the user using the data base 110.

The hot-desking portal 108 may then change the message on the display of the hot-desk panel 122, 400, 500 or 600 or on the display 803 of the telephone 800 and/or the color of the LED indicator light 226, 404, 504, 604, or 804, to show that the user has checked in. The hot-desking portal 108 may also send such confirmation to the hot-desking app stored in the user's personal communications device 120.

The hot-desking portal 108, in response to the user checking in, may also access the user data base 110, to obtain one or more unified communications (UC) user profiles of the user to enable the user to carry out various communications functions such as audio, web, and/or video conferencing, instant messaging, and the like.

Additionally, in response to the user checking in, the hot-desking portal 108 may deliver a personalized message to the user, such as on a desktop or laptop display, on the display of the telephone of the hot-desking station or workspace, or on the hot-desk panel of the hot-desking station or workspace.

FIG. 13 shows an example of the messages exchanged within an embodiment of the hot-desking system 100 when a user checks out from at the hot-desk or workspace 102 using the hot-desking app stored in the user's personal communications device 120.

First, using the hot-desking app stored in the user's personal communications device 120, the user enters a check out request that is transmitted over the one or more networks 106 to the hot-desking portal 108.

The hot-desking portal 108 then deactivates the hot-desk or workspace 102. Such deactivation may include deactivating one or more features, inputs, outputs, and/or ports of the docking station 104 depending on the facilities to be made available to the user. For example, power for one or more monitors, printers, and other peripherals, as well as connections to one or more physical networks, HDMI ports, and USB ports may be removed.

The hot-desking portal 108 may then also change the display on the hot-desk panel 122, 400, 500 or 600 or the display 803 of the telephone 800 to indicate that the hot-desk or workspace 102 is no longer booked. Instead, the display on the hot-desk panel may now indicate that the hot-desk or workspace 102 is now to be cleaned. Similarly, the hot-desking portal 108 may also change the color of the LED indicator light 226, 404, 504, 604, or 804 indicate that the hot-desk or workspace 102 is no longer booked and requires cleaning.

The hot-desking portal 108 may then also generate a report based on the most recent booking of the hot-desk or workspace 102. Alternatively, the hot-desking portal 108 may generate a cumulative report for a predetermined number of or date range of recent bookings for that the hot-desk or workspace 102. As a further alternative, the hot-desking portal 108 generate a cumulative report for some or all of the hot-desks or workspaces associated with that hot-desking portal 108.

The reports generated by the hot-desking portal 108 may include such information as how often each hot-desk or workspace 102 is booked and the features and amenities used, the number of reservations that were actually used versus the number booked, the number of no shows and whether certain users are consistent no shows, the usage associated by location within a building or company, the usage associated with a particular group or department, etc. The hot-desking portal 108 may also generate other utilization metrics and reports to provide feedback as to how to best utilize the hot-desks or workspaces.

FIG. 14 shows an example of the messages exchanged within an embodiment of the hot-desking system 100 when a user logs in using the hot-desk panel 122, 400, 500 or 600 of the hot-desk or workspace 102.

The user first uses soft keys shown on the display of the hot-desk panel 122, 400, 500 or 600, or may use one or more hard keys located on the hot-desk panel, to request to log in. The hot-desk panel then displays a login page requesting entry of a user login and password. The user then enters the user's login and password into the hot-desk panel using a displayed soft keyboard. The entered user login and password is then read by the hot-desking portal 108.

The hot-desking portal 108 then accesses the user data base 112 and looks up whether the received user login and password is stored in the user data base 112 as a valid login and password. If the login and password are found in the data base 112 and are valid, then the hot-desking portal 108 logs in the user. The hot-desking portal 108 then display a message on the hot-desk panel indicating that user has been authenticated.

Alternatively, if the login and password are not found in the user data base 112 or are stored in the user data base 112 but not as a valid login and password, then then the hot-desking portal 108 does not log in the user. The hot-desking portal 108 then controls the hot-desk panel to indicate that user has not been authenticated and user access is denied.

FIG. 15 shows an example of the messages exchanged within an embodiment of the hot-desking system 100 when a user reserves a hot-desk or workspace 102 using the hot-desk panel 122, 400, 500 or 600 of the hot-desk or workspace 102.

First, the user enters a request to reserve a desk. The user may then be required to enter the time and date desired. The user may also be required to enter information indicating the preferred location of the desk. Depending on the options available to the user, such location information may be as specific as a given desk or desks within a particular area of a specific building or adjacent to a particular group of other users. As an example, an employee that generally works in a particular building may make such a specific location request. Alternatively, the location specified may be as general as a particular city, state and/or country. For example, a user may make such a request in conjunction with travel to particular city, state and/or country.

The user may also be required to enter information indicating the amenities needed, such as the type of display needed, whether a laptop is needed or being provided by the user, the type of telephone needed, whether a printer is needed and the kind needed. For example, someone in a design position may require a display and printer better suited for graphics, whereas an employee doing more clerical type work may have other work needs.

Alternatively, some or all of the above information may be held in a user profile stored in the hot-desking portal 108 or in the user data base 110, thereby reducing or the amount of information that need be entered in conjunction with the reservation request. Additionally, information regarding the user's job and position may be stored in the hot-desking portal 108 and/or the user data base 110, so that the information associated with the type of work done in that position is also used in the reservation request.

After the user initiates the request for a hot-desk or workspace, the hot-desking portal 108 then accesses the user data base 110, using some or all of the received request information to verify that the user has permission to use a hot-desk or workspace at the requested location as well as whether the user has permission to use the particular facilities and amenities requested.

In response to the hot-desking portal 108 verifying the user's request, the hot-desking portal 108 then searches for an available hot-desk or workspace. Depending on the user's request, the hot-desking portal 108 may search for a hot-desk or workspace that is currently available at the requested location or a hot-desk or workspace that will be available at the requested location at a requested date and time.

Upon locating an available desk, the hot-desking portal 108 then displays information providing details of the reserved hot-desk or workspace on the hot-desk panel if the reserved hot-desk or workspace is not the one currently in use. Such information may include the desk, cubicle, or room number, and the location, floor and neighboring workers or facilities within the building. For more remote reservations, the information may include the building address as well as the city, state, and/or country where the building is located. Moreover, a map showing location within the building of the reserved hot-desk or workspace may be provided and/or a map showing the location of the building where the reserved hot-desk or workspace is located. Other information may include the facilities and amenities associated with the reserved desk, such as the type of display needed, whether a laptop is needed or being provided by the user, the type of telephone needed, whether a printer is needed and the kind needed.

In conjunction with the hot-desking portal 108 verifying the user request and locating a hot-desk or workspace 102, as described above, the hot-desking portal 108 also activates the hot-desk or workspace 102. Such activation may include activating one or more features, inputs, outputs, and/or ports of the docking station 104 depending on the facilities to be made available to the user. For example, power for one or more monitors, printers, and other peripherals, as well as connections to one or more physical networks, HDMI ports, and USB ports may be provided depending on the requirements of the particular user.

Additionally, in conjunction with the hot-desking portal 108 verifying the user request and locating a hot-desk or workspace 102, the hot-desking portal 108 may also activate the hot-desk panel 122, 400, 500 or 600 of the reserved hot-desk or workspace 102 or may change an existing display on the panel to reflect that the hot-desk or workspace 102 has been reserved. The hot-desk panel 122, 400, 500 or 600 may also provide messages indicating that the hot-desk or workspace 102 has been booked, is clean, dirty, occupied or available. The hot-desk panel 122, 400, 500 or 600 may also display the location of the hot-desk or workspace 102, the time of day, and/or the users who have reserved that hot-desk or workspace 102 together with the time and/or day booked.

Also, in conjunction with the hot-desking portal 108 verifying the user request and locating a hot-desk or workspace 102, the hot-desking portal 108 may also change the color of the LED indicator light 226, 404, 504, 604 of the hot-desk panel 122, 400, 500 or 600 and/or the LED indicator light or 804 of the telephone 800 to reflect the change of status of the hot-desk or workspace 102. For example, different colors may correspond to whether that hot-desk or workspace 102 has been booked, is clean, dirty, occupied or available.

FIG. 16 shows an example of the messages exchanged within an embodiment of the hot-desking system 100 when a user checks in at the reserved hot-desk or workspace 102 using the hot-desk panel 122, 400, 500 or 600.

First, if not already logged in, the user logs in to the hot-desk panel 122, 400, 500 or 600. Depending on the security requirements of a given hot-desking portal 108, the user may be required to log in, as described in FIG. 14, each time. Alternatively, the user may only need to log into the hot-desking portal 108 the first time the hot-desk panel is accessed.

Next, the user may enter a code previously provided to the user, enter a code sent to the user via a text message or an email message, or use an authenticator app on the user's personal communication device 120. The hot-desk panel 122, 400, 500 or 600 then transmits a check in request, together with the code data, over the one or more networks 106 to the hot-desking portal 108.

The hot-desking portal 108 may then access the user data base 110, using some or all of the received request information to again verify the user, and in response to the user being validated, locate the reservation using the 2D code data and check in the user. Alternatively, the hot-desking portal 108, after receiving the check in request and the scanned 2D code data, simply locates the reservation using the 2D code data and checks in the user without again verifying the user using the data base 110.

The hot-desking portal 108 may then change the message on the display of the hot-desk panel 122, 400, 500 or 600, and/or the message on the display 803 of the telephone 800, and/or the color of the LED indicator light 226, 404, 504, 604, or 804, to show that the user has checked in. The hot-desking portal 108 may also send such confirmation to the hot-desk panel 122, 400, 500 or 600.

FIG. 17 shows an example of the messages exchanged within an embodiment of the hot-desking system 100 when a user checks out from at the hot-desk or workspace 102 using the hot-desk panel 122, 400, 500 or 600.

First, using the hot-desk panel 122, 400, 500 or 600, the user enters a check out request that is transmitted over the one or more networks 106 to the hot-desking portal 108.

The hot-desking portal 108 then deactivates the hot-desk or workspace 102. Such deactivation may include deactivating one or more features, inputs, outputs, and/or ports of the docking station 104 depending on the facilities to be made available to the user. For example, power for one or more monitors, printers, and other peripherals, as well as connections to one or more physical networks, HDMI ports, and USB ports may be removed.

The hot-desking portal 108 may then also change the display on the hot-desk panel 122, 400, 500 or 600 to indicate that the hot-desk or workspace 102 is no longer booked. Instead, the display on the hot-desk panel may now indicate that the hot-desk or workspace 102 is now to be cleaned. Similarly, the hot-desking portal 108 may also change the color of the LED indicator light 226, 404, 504, 604, or 804 indicate that the hot-desk or workspace 102 is no longer booked and requires cleaning.

The hot-desking portal 108 may then also generate a report based on the most recent booking of the hot-desk or workspace 102. Alternatively, the hot-desking portal 108 may generate a cumulative report for a predetermined number of or date range of recent bookings for that the hot-desk or workspace 102. As a further alternative, the hot-desking portal 108 generate a cumulative report for some or all of the hot-desks or workspaces associated with that hot-desking portal 108.

FIG. 18 shows an example of the messages exchanged within an embodiment of the hot-desking system 100 when a user logs in using the touchscreen 803 of the telephone 800 of the hot-desk or workspace 102.

The user first uses soft keys shown on the touchscreen 803 of the telephone 800, to request to log in. The touchscreen 803 then displays a login page requesting entry of a user login and password. The user then enters the user's login and password into the hot-desk panel using a displayed soft keyboard. The entered user login and password is then read by the hot-desking portal 108.

The hot-desking portal 108 then accesses the user data base 112 and looks up whether the received user login and password is stored in the user data base 112 as a valid login and password. If the login and password are found in the data base 112 and are valid, then the hot-desking portal 108 logs in the user. The hot-desking portal 108 then displays a message on the touchscreen 803 and/or the hot-desk panel indicating that user has been authenticated.

Alternatively, if the login and password are not found in the user data base 112 or are stored in the user data base 112 but not as a valid login and password, then the hot-desking portal 108 does not log in the user. The hot-desking portal 108 then controls the touchscreen 803 and/or the hot-desk panel to indicate that user has not been authenticated and user access is denied.

FIG. 19 shows an example of the messages exchanged within an embodiment of the hot-desking system 100 when a user reserves a hot-desk or workspace 102 using the touchscreen 803 of the telephone 800 of the hot-desk or workspace 102.

First, the user enters a request to reserve that desk or another desk into the touchscreen 803. The user may then be required to enter the time and date desired. The user may also be required to enter information indicating the preferred location of the desk. Depending on the options available to the user, such location information may be as specific as a given desk or desks within a particular area of a specific building or adjacent to a particular group of other users. As an example, an employee that generally works in a particular building may make such a specific location request. Alternatively, the location specified may be as general as a particular city, state and/or country. For example, a user may make such a request in conjunction with travel to particular city, state and/or country.

The user may also be required to enter information indicating the amenities needed, such as the type of display needed, whether a laptop is needed or being provided by the user, the type of telephone needed, whether a printer is needed and the kind needed. For example, someone in a design position may require a display and printer better suited for graphics, whereas an employee doing more clerical type work may have other work needs.

Alternatively, some or all of the above information may be held in a user profile stored in the hot-desking portal 108 or in the user data base 110, thereby reducing or the amount of information that need be entered in conjunction with the reservation request. Additionally, information regarding the user's job and position may be stored in the hot-desking portal 108 and/or the user data base 110, so that the information associated with the type of work done in that position is also used in the reservation request.

After the user initiates the request for a hot-desk or workspace, the hot-desking portal 108 then accesses the user data base 110, using some or all of the received request information to verify that the user has permission to use a hot-desk or workspace at the requested location as well as whether the user has permission to use the particular facilities and amenities requested.

In response to the hot-desking portal 108 verifying the user's request, the hot-desking portal 108 then searches for an available hot-desk or workspace. Depending on the user's request, the hot-desking portal 108 may search for a hot-desk or workspace that is currently available at the requested location or a hot-desk or workspace that will be available at the requested location at a requested date and time.

Upon locating an available desk, the hot-desking portal 108 then displays information providing details of the reserved hot-desk or workspace on the hot-desk panel if the reserved hot-desk or workspace is not the one currently in use. Such information may include the desk, cubicle, or room number, and the location, floor and neighboring workers or facilities within the building. For more remote reservations, the information may include the building address as well as the city, state, and/or country where the building is located. Moreover, a map showing location within the building of the reserved hot-desk or workspace may be provided and/or a map showing the location of the building where the reserved hot-desk or workspace is located. Other information may include the facilities and amenities associated with the reserved desk, such as the type of display needed, whether a laptop is needed or being provided by the user, the type of telephone needed, whether a printer is needed and the kind needed.

In conjunction with the hot-desking portal 108 verifying the user request and locating a hot-desk or workspace 102, as described above, the hot-desking portal 108 also activates the hot-desk or workspace 102. Such activation may include activating one or more features, inputs, outputs, and/or ports of the docking station 104 depending on the facilities to be made available to the user. For example, power for one or more monitors, printers, and other peripherals, as well as connections to one or more physical networks, HDMI ports, and USB ports may be provided depending on the requirements of the particular user.

Additionally, in conjunction with the hot-desking portal 108 verifying the user request and locating a hot-desk or workspace 102, the hot-desking portal 108 may also activate the hot-desk panel 122, 400, 500 or 600 and the telephone 800 of the reserved hot-desk or workspace 102, or may change an existing display on the panel or touchscreen to reflect that the hot-desk or workspace 102 has been reserved. The hot-desk panel 122, 400, 500 or 600 and/or the touchscreen 803 of the telephone 800 may also provide messages indicating that the hot-desk or workspace 102 has been booked, is clean, dirty, occupied or available. The hot-desk panel 122, 400, 500 or 600 and/or the touchscreen 803 of the telephone 800 may also display the location of the hot-desk or workspace 102, the time of day, and/or the users who have reserved that hot-desk or workspace 102 together with the time and/or day booked.

Also, in conjunction with the hot-desking portal 108 verifying the user request and locating a hot-desk or workspace 102, the hot-desking portal 108 may also change the color of the LED indicator light 226, 404, 504, 604 of the hot-desk panel 122, 400, 500 or 600 and/or the LED indicator light 804 of the telephone 800 to reflect the change of status of the hot-desk or workspace 102. For example, different colors may correspond to whether that hot-desk or workspace 102 has been booked, is clean, dirty, occupied or available.

FIG. 20 shows an example of the messages exchanged within an embodiment of the hot-desking system 100 when a user checks in at the reserved hot-desk or workspace 102 using the touchscreen 803 of the telephone 800.

First, if not already logged in, the user logs in using the touchscreen 803 of the telephone 800. Depending on the security requirements of a given hot-desking portal 108, the user may be required to log in, as described in FIG. 18, each time. Alternatively, the user may only need to log into the hot-desking portal 108 the first time the hot-desk panel is accessed.

Next, the user may enter a code previously provided to the user, enter a code sent to the user via a text message or an email message, or use an authenticator app on the user's personal communication device 120. The telephone 800 then transmits a check in request, together with the code data, over the one or more networks 106 to the hot-desking portal 108.

The hot-desking portal 108 may then access the user data base 110, using some or all of the received request information to again verify the user, and in response to the user being validated, locate the reservation using the code data and check in the user. Alternatively, the hot-desking portal 108, after receiving the check in request and the code data, simply locates the reservation using the code data and checks in the user without again verifying the user using the data base 110.

The hot-desking portal 108 may then change the message on the display of the hot-desk panel 122, 400, 500 or 600, and/or the message on the display 803 of the telephone 800, and/or the color of the LED indicator light 226, 404, 504, 604, or 804, to show that the user has checked in.

FIG. 21 shows an example of the messages exchanged within an embodiment of the hot-desking system 100 when a user checks out from the hot-desk or workspace 102 using the touchscreen 803 of the telephone 800.

First, using the touchscreen 803 of the telephone 800, the user enters a check out request that is transmitted over the one or more networks 106 to the hot-desking portal 108.

The hot-desking portal 108 then deactivates the hot-desk or workspace 102. Such deactivation may include deactivating one or more features, inputs, outputs, and/or ports of the docking station 104 depending on the facilities to be made available to the user. For example, power for one or more monitors, printers, and other peripherals, as well as connections to one or more physical networks, HDMI ports, and USB ports may be removed.

The hot-desking portal 108 may then also change the display on the hot-desk panel 122, 400, 500 or 600 and/or on the touchscreen 803 of the telephone 800 to indicate that the hot-desk or workspace 102 is no longer booked. Instead, the display on the hot-desk panel may now indicate that the hot-desk or workspace 102 is now to be cleaned. Similarly, the hot-desking portal 108 may also change the color of the LED indicator light 226, 404, 504, 604, or 804 indicate that the hot-desk or workspace 102 is no longer booked and requires cleaning.

The hot-desking portal 108 may then also generate a report based on the most recent booking of the hot-desk or workspace 102. Alternatively, the hot-desking portal 108 may generate a cumulative report for a predetermined number of or date range of recent bookings for that the hot-desk or workspace 102. As a further alternative, the hot-desking portal 108 generate a cumulative report for some or all of the hot-desks or workspaces associated with that hot-desking portal 108.

FIG. 22 shows an example of the messages exchanged within an embodiment of the hot-desking system 100 when a user directly communicates with the hot-desking portal 108 to log in to the hot-desking portal 108. The user may then directly reserve a hot-desk or workspace 102, check in to a reserved hot-desk or workspace 102, and/or check out from a hot-desk or workspace 102.

First, opens a browser or app on the personal communication device 120 or on a laptop or other device. The user then opens a browser page to a URL for accessing the hot-desking portal 108. The hot-desking portal 108 then displays a login page on the browser requesting entry of a user login and password. The user then enters the user's login and password into the hot-desking app on the user's personal communications device. The entered user login and password is then transmitted over the one or more networks 106 to the hot-desking portal 108.

The hot-desking portal 108 then accesses the user data base 112 and looks up whether the received user login and password is stored in the user data base 112 as a valid login and password. If the login and password are found in the data base 112 and are valid, then the hot-desking portal 108 logs in the user. The hot-desking portal 108 then transmits a message over the one or more networks 106 to the browser or app indicating that user has been authenticated.

Alternatively, if the login and password are not found in the user data base 112 or are stored in the user data base 112 but not as a valid login and password, then the hot-desking portal 108 does not log in the user. The hot-desking portal 108 then transmits a message over the one or more networks 106 to the browser or app to indicate that user has not been authenticated and user access is denied.

FIG. 23 shows an example of the messages exchanged within an embodiment of the hot-desking system 100 when a user reserves a hot-desk or workspace 102 directly from the hot-desking portal 108.

First, depending on the security requirements of a given hot-desking portal 108, the user may be required to log in, as described in FIG. 22, each time the hot-desking app is opened or accessed. Alternatively, the user may only need to log into the hot-desking portal 108 the first time the hot-desking app is opened or accessed.

Next, the user enters a request to reserve that desk or another desk into the user's browser or app. The user may then be required to enter the time and date desired. The user may also be required to enter information indicating the preferred location of the desk. Depending on the options available to the user, such location information may be as specific as a given desk or desks within a particular area of a specific building or adjacent to a particular group of other users. As an example, an employee that generally works in a particular building may make such a specific location request. Alternatively, the location specified may be as general as a particular city, state and/or country. For example, a user may make such a request in conjunction with travel to particular city, state and/or country.

The user may also be required to enter information indicating the amenities needed, such as the type of display needed, whether a laptop is needed or being provided by the user, the type of telephone needed, whether a printer is needed and the kind needed. For example, someone in a design position may require a display and printer better suited for graphics, whereas an employee doing more clerical type work may have other work needs.

Alternatively, some or all of the above information may be held in a user profile stored in the hot-desking portal 108 or in the user data base 110, thereby reducing or the amount of information that need be entered in conjunction with the reservation request. Additionally, information regarding the user's job and position may be stored in the hot-desking portal 108 and/or the user data base 110, so that the information associated with the type of work done in that position is also used in the reservation request.

After the user initiates the request for a hot-desk or workspace, the hot-desking portal 108 then accesses the user data base 110, using some or all of the received request information to verify that the user has permission to use a hot-desk or workspace at the requested location as well as whether the user has permission to use the particular facilities and amenities requested.

In response to the hot-desking portal 108 verifying the user's request, the hot-desking portal 108 then searches for an available hot-desk or workspace. Depending on the user's request, the hot-desking portal 108 may search for a hot-desk or workspace that is currently available at the requested location or a hot-desk or workspace that will be available at the requested location at a requested date and time.

Upon locating an available desk, the hot-desking portal 108 then displays information providing details of the reserved hot-desk or workspace on the user's browser or app. Such information may include the desk, cubicle, or room number, and the location, floor and neighboring workers or facilities within the building. For more remote reservations, the information may include the building address as well as the city, state, and/or country where the building is located. Moreover, a map showing location within the building of the reserved hot-desk or workspace may be provided and/or a map showing the location of the building where the reserved hot-desk or workspace is located. Other information may include the facilities and amenities associated with the reserved desk, such as the type of display needed, whether a laptop is needed or being provided by the user, the type of telephone needed, whether a printer is needed and the kind needed.

In conjunction with the hot-desking portal 108 verifying the user request and locating a hot-desk or workspace 102, as described above, the hot-desking portal 108 also activates the hot-desk or workspace 102. Such activation may include activating one or more features, inputs, outputs, and/or ports of the docking station 104 depending on the facilities to be made available to the user. For example, power for one or more monitors, printers, and other peripherals, as well as connections to one or more physical networks, HDMI ports, and USB ports may be provided depending on the requirements of the particular user.

Additionally, in conjunction with the hot-desking portal 108 verifying the user request and locating a hot-desk or workspace 102, the hot-desking portal 108 may also activate the hot-desk panel 122, 400, 500 or 600 and the telephone 800 of the reserved hot-desk or workspace 102, or may change an existing display on the panel or touchscreen to reflect that the hot-desk or workspace 102 has been reserved. The hot-desk panel 122, 400, 500 or 600 and/or the touchscreen 803 of the telephone 800 may also provide messages indicating that the hot-desk or workspace 102 has been booked, is clean, dirty, occupied or available. The hot-desk panel 122, 400, 500 or 600 and/or the touchscreen 803 of the telephone 800 may also display the location of the hot-desk or workspace 102, the time of day, and/or the users who have reserved that hot-desk or workspace 102 together with the time and/or day booked.

Also, in conjunction with the hot-desking portal 108 verifying the user request and locating a hot-desk or workspace 102, the hot-desking portal 108 may also change the color of the LED indicator light 226, 404, 504, 604 of the hot-desk panel 122, 400, 500 or 600 and/or the LED indicator light 804 of the telephone 800 to reflect the change of status of the hot-desk or workspace 102. For example, different colors may correspond to whether that hot-desk or workspace 102 has been booked, is clean, dirty, occupied or available.

FIG. 24 shows an example of the messages exchanged within an embodiment of the hot-desking system 100 when a user checks in at the reserved hot-desk or workspace 102 by directly communicating with the hot-desking portal 108.

First, if not already logged in, the user logs in to the hot-desking portal 108 using the hot-desking portal web page on the user's browser or app. Depending on the security requirements of a given hot-desking portal 108, the user may be required to log in, as described in FIG. 22, each time. Alternatively, the user may only need to log into the hot-desking portal 108 the first time the hot-desk panel is accessed.

Next, the user may enter a code previously provided to the user, enter a code sent to the user via a text message or an email message, or use an authenticator app on the user's personal communication device 120. The telephone 800 then transmits a check in request, together with the code data, over the one or more networks 106 to the hot-desking portal 108.

The hot-desking portal 108 may then access the user data base 110, using some or all of the received request information to again verify the user, and in response to the user being validated, locate the reservation using the code data and check in the user. Alternatively, the hot-desking portal 108, after receiving the check in request and the code data, simply locates the reservation using the code data and checks in the user without again verifying the user using the data base 110.

The hot-desking portal 108 then transmits a message over the one or more networks 106 indicating that the user has checked in. The hot-desking portal 108 may then change the message on the display of the hot-desk panel 122, 400, 500 or 600, and/or the message on the display 803 of the telephone 800, and/or the color of the LED indicator light 226, 404, 504, 604, or 804, to show that the user has checked in.

FIG. 25 shows an example of the messages exchanged within an embodiment of the hot-desking system 100 when a user checks out from the hot-desk or workspace 102 by directly communicating with the hot-desking portal 108.

First, if not already logged in, the user logs in to the hot-desking portal 108 using the hot-desking portal web page on the user's browser or app. Depending on the security requirements of a given hot-desking portal 108, the user may be required to log in each time. Then, the user enters a check out request into the user's browser or app that is transmitted over the one or more networks 106 to the hot-desking portal 108.

The hot-desking portal 108 then deactivates the hot-desk or workspace 102. Such deactivation may include deactivating one or more features, inputs, outputs, and/or ports of the docking station 104 depending on the facilities to be made available to the user. For example, power for one or more monitors, printers, and other peripherals, as well as connections to one or more physical networks, HDMI ports, and USB ports may be removed.

The hot-desking portal 108 may then also change the display on the hot-desk panel 122, 400, 500 or 600 and/or on the touchscreen 803 of the telephone 800 to indicate that the hot-desk or workspace 102 is no longer booked. Instead, the display on the hot-desk panel may now indicate that the hot-desk or workspace 102 is now to be cleaned. Similarly, the hot-desking portal 108 may also change the color of the LED indicator light 226, 404, 504, 604, or 804 indicate that the hot-desk or workspace 102 is no longer booked and requires cleaning.

The hot-desking portal 108 may then also generate a report based on the most recent booking of the hot-desk or workspace 102. Alternatively, the hot-desking portal 108 may generate a cumulative report for a predetermined number of or date range of recent bookings for that the hot-desk or workspace 102. As a further alternative, the hot-desking portal 108 generate a cumulative report for some or all of the hot-desks or workspaces associated with that hot-desking portal 108.

Though FIGS. 10-13 show examples of a user logging in, reserving a hot-desk or workspace, checking in to the hot-desk or workspace, and checking out from the hot-desk or workspace, each using a hot-desking app stored in the user's personal communications device 120, the user need not carry out all of these operations solely with the hot-desking app. Likewise, though FIGS. 14-17 show examples of a user logging in, reserving a hot-desk or workspace, checking in to the hot-desk or workspace, and checking out from the hot-desk or workspace, each using the hot-desk panel 122, 400, 500 or 600 of the hot-desk or workspace, the user need not carry out all of these operations solely using the hot-desk panel. Further, though FIGS. 18-21 show examples of a user logging in, reserving a hot-desk or workspace, checking in to the hot-desk or workspace, and checking out from the hot-desk or workspace, each using the touchscreen 803 of the telephone 800 of the hot-desk or workspace 102, the user need not carry out all of these operations solely using the touchscreen of the telephone. Moreover, though FIGS. 22-25 show examples of a user logging in, reserving a hot-desk or workspace, checking in to the hot-desk or workspace, and checking out from the hot-desk or workspace, each directly using the hot-desk portal, the user need not carry out all of these operations solely by directly using the hot-desk portal. Rather, the user may perform one or more of these operations using the hot-desking app, perform one or more of these operations using the hot-desk panel 122, 400, 500 or 600, perform one or more of these operations using the touchscreen of the telephone, and/or perform one or more of these operations directly using the hot-desk portal. For example, the user may log in and reserve the hot-desk or workspace using the hot-desking app, then check in using the display of the hot-desk panel 122, 400, 500 or 600 of the hot-desk or workspace, and thereafter check out using the using the touchscreen 803 of the telephone 800 of the hot-desk or workspace 102. Likewise, the user may log in to the hot-desk portal and reserve the hot-desk or workspace using the hot-desk portal, then check in by scanning the 2D code displayed on the hot-desk panel 122, 400, 500 or 600, then check out using the display of the hot-desk panel 122, 400, 500 or 600. Similarly, other combinations thereof are also within the scope of the embodiment.

FIG. 26 shows an example of the messages exchanged within an embodiment of the hot-desking system 100 when the time reserved at the hot-desk or workspace 102 end before the user may check out from the hot-desk or workspace 102 as shown in FIG. 13, 17, 21 or 25.

First, the hot-desking portal 108 changes the display on the hot-desk panel 122, 400, 500 or 600 and/or on the touchscreen 803 of the telephone 800 to indicate that period reserved by the user has ended. Also, the display on the hot-desk panel may now indicate that the hot-desk or workspace 102 is now to be cleaned. Similarly, the hot-desking portal 108 may also change the color of the LED indicator light 226, 404, 504, 604, or 804 indicate that the hot-desk or workspace 102 is no longer booked and requires cleaning. The hot-desking portal 108 also transmits a message over the one or more networks 106 to the user indicating that reservation period has ended. The message may be sent to the app running on the user's personal communications device 120, as a text message, and/or as an email message.

The hot-desking portal 108 then deactivates the hot-desk or workspace 102. Such deactivation may include deactivating one or more features, inputs, outputs, and/or ports of the docking station 104 depending on the facilities to be made available to the user. For example, power for one or more monitors, printers, and other peripherals, as well as connections to one or more physical networks, HDMI ports, and USB ports may be removed.

The hot-desking portal 108 may then also generate a report based on the most recent booking of the hot-desk or workspace 102. Alternatively, the hot-desking portal 108 may generate a cumulative report for a predetermined number of or date range of recent bookings for that the hot-desk or workspace 102. As a further alternative, the hot-desking portal 108 generate a cumulative report for some or all of the hot-desks or workspaces associated with that hot-desking portal 108.

FIG. 27 shows an example of the messages exchanged within an embodiment of a smart locker system, similar to the hot-desking system 100, when a user is assigned a smart locker. Such smart lockers are known in the art for automating package delivery, notification and distribution.

More specifically, information pertaining to a user may be entered via the admin portal 110 into the user database 112.

FIG. 28 shows an example of the messages exchanged within an embodiment of a smart locker system when a user logs in using an app stored in the user's personal communications device.

The user first launches a hot-desking app stored in the user's personal communications device, such as a smart phone, which then opens a browser page to a URL for accessing a smart locker portal. The smart locker portal then displays a login page requesting entry of a user login and password. The user then enters the user's login and password into the hot-desking app on the user's personal communications device. The entered user login and password is then transmitted over the one or more networks 106 to the smart locker portal 108.

The smart locker portal then accesses the user data base 112 and looks up whether the received user login and password is stored in the user data base 112 as a valid login and password. If the login and password are found in the data base 112 and are valid, then the hot-desking portal 108 logs in the user. The smart locker portal then transmits a message over the one or more networks 106 to the smart locker app running on the user's personal communications device 120 indicating that user has been authenticated.

Alternatively, if the login and password are not found in the user data base 112 or are stored in the user data base 112 but not as a valid login and password, then then the smart locker portal does not log in the user. The smart locker portal then transmits a message over the one or more networks 106 to the smart locker app running on the user's personal communications device 120 indicating that user has not been authenticated and user access is denied.

FIG. 29 shows an example of the messages exchanged within an embodiment of the smart locker system when a user checks in at their smart locker using the smart locker app stored in the user's personal communications device 120.

First, if not already open, the user opens the smart locker app stored in the user's personal communications device 120. Depending on the security requirements of a given smart locker portal, the user may be required to log in, as described in FIG. 28, each time the smart locker app is opened or accessed. Alternatively, the user may only need to log into the smart locker portal the first time the smart locker app is opened or accessed.

Next, using the QR reader app on the user's personal communication device 120, the user scans a 2D code on a display of a smart locker panel. The smart locker app stored in the user's personal communications device 120 then transmits a check in request, together with the scanned 2D code data, over the one or more networks 106 to the smart locker portal 108.

The smart locker portal may then access the user data base 110, using some or all of the received request information to again verify the user, and in response to the user being validated, locate the reservation using the 2D code data and check in the user. Alternatively, the smart locker portal, after receiving the check in request and the scanned 2D code data, simply locates the reservation using the 2D code data and checks in the user without again verifying the user using the data base 110.

The smart locker portal may then change the message displayed on the smart locker panel to show that the user has checked in. smart locker portal may also send such confirmation to the smart locker app stored in the user's personal communications device 120.

After the user has checked in, the smart locker portal then enables access to the smart locker, such as by transmitting a signal over the one or more networks 106 to the smart locker that instructs the smart locker to pen so the used may access the contents stored therein.

INDUSTRIAL APPLICABILITY

To solve the aforementioned problems, the present embodiments are directed towards a hot-desking system, and more specifically to systems, methods, and modes for providing a hot-desking station or workspace. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described as being in particular combinations, each feature or element may be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that may be derived from the description contained herein by a person skilled in the art. No element, act, or instruction used in the description of the present application should be construed as critical or essential to the embodiments unless explicitly described as such. Also, as used herein, the article "a" is intended to include one or more items.

In addition, the above disclosed methods are not meant to limit the aspects of the embodiments, or to suggest that the aspects of the embodiments should be implemented following the aforementioned methods. The purpose of the aforementioned methods is to facilitate the understanding of one or more aspects of the embodiments and to provide the reader with one or many possible implementations of the processed discussed herein. It should be understood by one of ordinary skill in the art that the steps of the aforementioned methods may be performed in a different order and that some steps may be eliminated or substituted.

All United States patents and applications, foreign patents, and publications discussed above are hereby incorporated herein by reference in their entireties.

Alternate Embodiments

Alternate embodiments may be devised without departing from the spirit or the scope of the embodiments.

What is claimed is:

1. A system for reserving and providing a user with a personalized workspace, the system comprising:
   (a) at least one workspace, including
      (1) at least one workspace device;
   (b) at least one panel associated with the at least one workspace, and including
      (1) an associated display, wherein
      (2) the at least one panel is configured to control the associated display;
   (c) at least one docking station, including
      (1) a plurality of power ports, and
      (2) a plurality of data ports, wherein
      (3) at least one power port of the plurality of power ports and at least one data port of the plurality of data ports are connected to the at least one workspace device; and
   (d) a portal configured to control operation and configuration of the at least one workspace, the at least one docking station, and the at least one panel, the portal being further configured to
      (1) receive a user-initiated request to reserve a workspace for a predetermined period, the user request specifying one or more workspace devices required by the user,
      (2) reserve the at least one workspace for the user for the predetermined period based on the user request, including
         (A) generating a two-dimensional barcode ("2D code") that is unique to the reserved workspace and unique to that reservation, and
         (B) transmitting the generated 2D code to the panel associated with the reserved workspace for presentation on the associated display,
      (3) transmit information about the reserved workspace to a user device,
      (4) receive, from the user device, data generated by the user device from a scan of the 2D code presented on the associated display, and
      (5) in response to receiving the scanned data,
         (A) check in the user into the reserved workspace, and
         (B) activate and configure the at least one docking station according to the user request, including
            (i) activating the at least one power port of the plurality of power ports and the at least one data port of the plurality of data ports of the at least one docking station upon the at least one workspace device connected thereto substantially matching at least one of the one or more workspace devices specified in the user request,
            (ii) the user thereby being supplied with a personalized workspace in response to the user merely providing the user request and then checking in.

2. The system of claim 1, wherein
   (a) the at least one panel, the at least one docking station, the portal, and the user device communicate over one or more communication networks.

3. The system of claim 1, wherein
   (a) the portal is further configured to receive the user-initiated request from at least one of
      (1) the user device, the user-initiated request being entered using the user device,
      (2) the at least one panel associated with the at least one workspace, the associated display of the at least one panel including a touchscreen by which the user-initiated request is entered,
      (3) another panel in communication with the portal, the another panel including another display and being configured to control the another display, the another display including a touchscreen by which the user-initiated request is entered,
      (4) a personal computer in communication with the portal, the user-initiated request being entered using the personal computer, or
      (5) a desk telephone in communication with the portal, the desk telephone having a touchscreen by which the user-initiated request is entered.

4. The system of claim 1, wherein the portal is further configured to
   (a) receive, in addition to the user-initiated request, identification information associated with the user,
   (b) communicate with a user database to verify the identification information, and
   (c) reserve the at least one workspace for the user for the predetermined period in response to the identification information being verified.

5. The system of claim 4, wherein the portal is further configured to
   (a) transmit to the user device
      (1) an indication that the identification information associated with the user was verified, and
      (2) a location and features of the reserved workspace, whereby the user is able to locate the reserved workspace.

6. The system of claim 4, further comprising
   (a) an admin portal configured to access the user database and to carry out at least one of addition, deletion, or modification of data associated with the user that is stored in the user database.

7. The system of claim 1, wherein
   (a) the portal is further configured to, in response to receiving the scanned data,
      (1) disable any remaining ones of the plurality of power ports and any remaining ones of the plurality of data ports of the at least one docking station that are not connected to any workspace device substantially matching any one of the one or more workspace devices specified in the user request.

8. The system of claim 1, wherein
   (a) the portal is further configured to
      (1) receive a subsequent user-initiated request to check out from the reserved workspace, and
      (2) in response to receiving the subsequent user-initiated request,
         (A) automatically deactivate the previously activated at least one power port of the plurality of power ports and the previously activated at least one data port of the plurality of data ports of the at least one docking station.

9. The system of claim 8, wherein
(a) the portal is further configured to, in response to receiving the subsequent user-initiated request,
(1) communicate with the at least one panel as to the check out from the reserved workspace so that the at least one panel controls the associated display to indicate accordingly.

10. The system of claim 8, wherein
(a) the portal is further configured to receive the subsequent user-initiated request from at least one of
(1) the user device,
(2) the at least one panel associated with the reserved workspace, the associated display of the at least one panel including a touchscreen by which the subsequent user-initiated request is entered,
(3) another panel in communication with the portal and that includes another display, the display of the another panel including a touchscreen by which the subsequent user-initiated request is entered,
(4) a personal computer in communication with the portal, or
(5) a desk telephone in communication with the portal, the desk telephone including a touchscreen by which the subsequent user-initiated request is entered.

11. The system of claim 1, wherein
(a) the generated 2D code includes at least one of a QR code or a matrix barcode.

12. The system of claim 1, wherein
(a) the generated 2D code is at least one of
(1) associated with the user such that only the user is able to check into the reserved workspace,
(2) associated with a particular organization such that only users associated with that organization are able to check into the reserved workspace, or
(3) associated with one or more particular days of the week such that the user is only able to check into the reserved workspace on the one or more particular days of the week.

13. The system of claim 1, wherein
(a) the portal is further configured to, at an end of the predetermined period,
(1) automatically deactivate the previously activated at least one power port of the plurality of power ports and the previously activated at least one data port of the plurality of data ports of the at least one docking station,
(2) communicate with the user device that the predetermined period has ended, and
(3) communicate with the at least one panel that the predetermined period has ended so that the at least one panel controls the associated display to indicate accordingly.

14. The system of claim 1, wherein
(a) at least one of the portal or a user database is configured to store a user profile, including at least one of
(1) one or more additional workspace devices required by the user upon requesting a workspace, or
(2) information associated communication functions and other job functions carried out by the user.

15. The system of claim 14, wherein
(a) the portal is further configured to, in response to receiving the scanned data,
(1) further configure the at least one docking station according to the user profile, including
(A) activating the at least one power port of the plurality of power ports and the at least one data port of the plurality of data ports of the at least one docking station upon the at least one workspace device connected thereto substantially matching at least one of the one or more additional workspace devices specified in the user profile.

16. A system for reserving and providing a user with a personalized workspace, the system comprising:
(a) at least one workspace, including
(1) a plurality of workspace devices;
(b) at least one panel associated with the at least one workspace, and including
(1) an associated display, wherein
(2) the at least one panel is configured to control the associated display;
(c) at least one docking station, including
(1) a plurality of power ports, and
(2) a plurality of data ports, wherein
(3) each one of the plurality of workspace devices is connected to at least one associated power port of the plurality of power ports and at least one associated data port of the plurality of data ports; and
(d) a portal configured to control operation and configuration of the at least one workspace, the at least one docking station, and the at least one panel, the portal being further configured to
(1) receive a user-initiated request to reserve a workspace for a predetermined period, the user request specifying one or more workspace devices required by the user,
(2) reserve the at least one workspace for the user for the predetermined period based on the user request,
(A) generating a two-dimensional barcode ("2D code") that is unique to the reserved workspace and unique to that reservation, and
(B) transmitting the generated 2D code to the panel associated with the reserved workspace for presentation on the associated display,
(3) transmit information about the reserved workspace to a user device,
(4) receive, from the user device, data generated by the user device from a scan of the 2D code presented on the associated display, and
(5) in response to receiving the scanned data,
(A) check in the user into the reserved workspace, and
(B) activate and configure the at least one docking station according to the user request, including
(i) for each one of the plurality of workspace devices, activating the at least one associated power port of the plurality of power ports and the at least one associated data port of the plurality of data ports connected thereto upon that workspace device substantially matching at least one of the one or more workspace devices specified in the user request,
(ii) the user thereby being supplied with a personalized workspace in response to the user merely providing the user request and then checking in.

17. The system of claim 16, wherein
(a) the portal is further configured to receive the user-initiated request from at least one of
(1) the user device, the user-initiated request being entered using the user device,
(2) the at least one panel associated with the at least one workspace, the associated display of the at least one panel including a touchscreen by which the user-initiated request is entered, (3) another panel in communication with the portal, the another panel including another display and being configured to control the another display, the another display including a touchscreen by which the user-initiated request is entered, (4) a personal computer in communication with the portal, the user-initiated request being entered using the personal computer, or (5) a desk telephone in communication with the portal, the desk telephone having a touchscreen by which the user-initiated request is entered.

18. The system of claim 16, wherein the portal is further configured to (a) receive, in addition to the user-initiated request, identification information associated with the user, (b) communicate with a user database to verify the identification information, and (c) reserve the at least one workspace for the user for the predetermined period in response to the identification information being verified.

19. The system of claim 16, wherein (a) the generated 2D code is at least one of (1) associated with the user such that only the user is able to check into the reserved workspace, (2) associated with a particular organization such that only users associated with that organization are able to check into the reserved workspace, or (3) associated with one or more particular days of the week such that the user is only able to check into the reserved workspace on the one or more particular days of the week.

20. A system for reserving and providing a user with a personalized workspace, the system comprising:

(a) a plurality of workspaces, each including (1) at least one workspace device;

(b) a plurality of panels respectively associated with the plurality of workspaces, each one of the plurality of panels including (1) an associated display, (2) each one of the plurality of panels being configured to control its associated display;

(c) a plurality of docking stations respectively associated with the plurality of workspaces, each one of the plurality of docking stations including (1) an associated plurality of power ports, and (2) an associated plurality of data ports, wherein (3) for each one of the plurality of docking stations, at least one power port of the plurality of power ports and at least one data port of the plurality of data ports of that docking station are connected to the at least one workspace device of its respectively associated workspace; and (d) a portal configured to control operation and configuration of the plurality of workspaces, the plurality of docking stations, and the plurality of panels, the portal being further configured to (1) receive a user-initiated request to reserve a workspace for a predetermined period, the user request specifying one or more workspace devices required by the user, (2) select one of the plurality of workspaces based on the user request and reserve that workspace for the user for the predetermined period, including (A) generating a two-dimensional barcode ("2D code") that is unique to the reserved workspace and unique to that reservation, and (B) transmitting the generated 2D code to the one of the plurality of panels respectively associated with the reserved workspace for presentation on the display of that panel, (3) transmit information about the reserved workspace to a user device, (4) receive, from the user device, data generated by the user device from a scan of the 2D code presented on the display of the panel respectively associated with the reserved workspace, and (5) in response to receiving the scanned data, (A) check in the user into the reserved workspace, and (B) activate and configure, in accordance with the user request, the one of the plurality of docking stations respectively associated with the reserved workspace, including (i) activating the at least one power port of the plurality of power ports and the at least one data port of the plurality of data ports of that docking station upon the at least one workspace device connected thereto substantially matching at least one of the one or more workspace devices specified in the user request, (ii) the user thereby being supplied with a personalized workspace in response to the user merely providing the user request and then checking in.

21. The system of claim 20, wherein (a) the portal is further configured to receive the user-initiated request from at least one of (1) the user device, the user-initiated request being entered using the user device, (2) the panel associated with the at least one workspace, the display of the panel including a touchscreen by which the user-initiated request is entered, (3) another panel in communication with the portal, the another panel including another display and being configured to control the another display, the another display including a touchscreen by which the user-initiated request is entered, (4) a personal computer in communication with the portal, the user-initiated request being entered using the personal computer, or (5) a desk telephone in communication with the portal, the desk telephone having a touchscreen by which the user-initiated request is entered.

22. The system of claim 20, wherein the portal is further configured to (a) receive, in addition to the user-initiated request, identification information associated with the user, (b) communicate with a user database to verify the identification information, and (c) reserve the one of the plurality of workspaces for the user for the predetermined period in response to the identification information being verified.

23. The system of claim 20, wherein (a) the generated 2D code is at least one of (1) associated with the user such that only the user is able to check into the reserved workspace, (2) associated with a particular organization such that only users associated with that organization are able to check into the reserved workspace, or (3) associated with one or more particular days of the week such that the user is only able to check into the reserved workspace on the one or more particular days of the week.

24. The system of claim 20, wherein
(a) at least one of the portal or a user database is configured to store a user profile, including at least one of
  (1) one or more additional workspace devices required by the user upon requesting a workspace, or
  (2) information associated communication functions and other job functions carried out by the user, and
(b) the portal is further configured to
  (1) select the one of the plurality of workspaces based on the user request and the user profile, and reserve that workspace for the user for the predetermined period.

\* \* \* \* \*